US009426644B2

United States Patent
Zhao et al.

(10) Patent No.: US 9,426,644 B2
(45) Date of Patent: Aug. 23, 2016

(54) METHOD FOR ACTIVATING SOFT SIM CARD, METHOD FOR SOFT SIM CARD TO JOIN NETWORK, TERMINAL AND NETWORK ACCESS DEVICE

(71) Applicant: Huawei Technologies Co., Ltd., Shenzhen (CN)

(72) Inventors: Yuqing Zhao, Shenzhen (CN); Yuhua Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/707,449

(22) Filed: May 8, 2015

(65) Prior Publication Data

US 2015/0245195 A1 Aug. 27, 2015

Related U.S. Application Data

(63) Continuation of application No. PCT/CN2013/075491, filed on May 10, 2013.

(30) Foreign Application Priority Data

Nov. 9, 2012 (CN) .......................... 2012 1 0447578

(51) Int. Cl.
 *H04W 8/18* (2009.01)
 *H04W 12/04* (2009.01)
 *H04W 12/06* (2009.01)
(52) U.S. Cl.
 CPC .............. *H04W 8/183* (2013.01); *H04W 12/04* (2013.01); *H04W 12/06* (2013.01)
(58) Field of Classification Search
 CPC ...... H04W 8/183; H04W 12/04; H04W 12/06
 USPC ........................... 455/558, 410, 411, 418–420
 See application file for complete search history.

(56) References Cited

U.S. PATENT DOCUMENTS

| 8,712,474 B2 * | 4/2014 | Gehrmann | ............ | H04W 8/205 |
| | | | | 455/411 |
| 2007/0077966 A1 * | 4/2007 | Huang | .................. | H04W 12/06 |
| | | | | 455/558 |

(Continued)

FOREIGN PATENT DOCUMENTS

| CN | 101616401 A | 12/2009 |
| CN | 101635920 A | 1/2010 |

(Continued)

OTHER PUBLICATIONS

"Subscriber identity module," Wikipedia, the free encyclopedia, https://en.wikipedia.org/wiki/Subscriber identity_ module (Nov. 8, 2012).

*Primary Examiner* — Sharad Rampuria
(74) *Attorney, Agent, or Firm* — Leydig, Voit & Mayer, Ltd.

(57) ABSTRACT

A method for activating a soft SIM card, a method for a soft SIM card to join network, a terminal and a network access device are provided. The method for activating includes: acquiring information on a terminal in which a soft SIM card is located of a bounding object corresponding to the soft SIM card; generating first key information according to information of the soft SIM card and the information on the terminal in which the soft SIM card is located of the bounding object and according to a predefined encryption policy; comparing whether the first key information is consistent with preset key information corresponding to the soft SIM card, if consistent, allowing an activation of the soft SIM card, so as to enable a user to perform network communication via the soft SIM card. The technical solutions are beneficial for improving the application security of the soft SIM card.

15 Claims, 7 Drawing Sheets

(56) References Cited

U.S. PATENT DOCUMENTS

| | | | | |
|---|---|---|---|---|
| 2008/0003980 A1* | 1/2008 | Voss | ............. | H04L 63/0853 455/411 |
| 2011/0059773 A1 | 3/2011 | Neumann et al. | | |
| 2011/0136482 A1* | 6/2011 | Kaliner | ............. | H04W 12/04 455/418 |
| 2012/0108205 A1* | 5/2012 | Schell | ............. | H04W 4/001 455/411 |
| 2012/0108294 A1* | 5/2012 | Kaul | ............. | G06K 7/0013 455/558 |
| 2012/0144194 A1 | 6/2012 | Zhao | | |
| 2012/0190354 A1* | 7/2012 | Merrien | ............. | H04W 4/001 455/422.1 |
| 2012/0196569 A1* | 8/2012 | Holtmanns | ............. | H04L 63/0428 455/411 |
| 2014/0057600 A1* | 2/2014 | Dung | ............. | H04W 8/02 455/411 |
| 2014/0066011 A1* | 3/2014 | Bradley | ............. | H04W 8/205 455/410 |
| 2014/0171027 A1* | 6/2014 | Arkko | ............. | H04L 63/0853 455/411 |
| 2014/0220939 A1* | 8/2014 | Takae | ............. | H04W 12/08 455/411 |
| 2014/0315535 A1* | 10/2014 | Bajko | ............. | H04W 8/20 455/419 |
| 2015/0208239 A1* | 7/2015 | Bai | ............. | H04W 12/06 455/411 |

FOREIGN PATENT DOCUMENTS

| | | |
|---|---|---|
| CN | 101790149 A | 7/2010 |
| CN | 102037754 A | 4/2011 |
| EP | 2515565 A1 | 10/2012 |
| WO | WO 2012085593 A1 | 6/2012 |

\* cited by examiner

METHOD FOR ACTIVATING SOFT SIM CARD, METHOD FOR SOFT SIM CARD TO JOIN NETWORK, TERMINAL AND NETWORK ACCESS DEVICE

CROSS-REFERENCE TO RELATED APPLICATIONS

This application is a continuation of International Patent Application No. PCT/CN2013/075491, filed on May 10, 2013, which claims priority to Chinese Patent Application No. 201210447578.2, filed on Nov. 9, 2012, both of which are hereby incorporated by reference in their entireties.

TECHNICAL FIELD

The present invention relates to communication technologies and, in particular, to a method for activating a soft SIM, a method for a soft SIM card to join a network, a terminal and a network access device.

BACKGROUND

The global system of mobile communication (referred to as GSM), is the most widely used mobile phone standard currently.

A subscriber identity module (commonly known as SIM card), is also referred to as a subscriber identity card. The SIM card is a communication module provided for a user based on a requirement of the user by a communication network operator, so as to enable the user to perform network communication with the operator's network by utilizing data communication circuits on the SIM card, thereby realizing the network communication service applications of the terminal. The types of SIM cards, and the data and protocols in the SIM cards provided by different network operators are different.

According to types of data in the SIM card, it mainly includes the following:

Fixed data in the SIM card, which is written by a SIM card center before a mobile phone is sold, and includes a international mobile subscriber identification number (referred to as IMSI), a key identifier (KI), an authentication and encryption algorithm, and so on. This part of data in the SIM card is important application data for activating the SIM card and joining the operator's network by the SIM card;

Network related dynamic data in the SIM card, for example, a location area identity (LAI), a temporary mobile subscriber identity (TMSI), a public telephone network code which is prohibited to access to, and so on. This part of data in the SIM card is dynamic application data when the SIM card updates location information in the operator's network;

Service code related to the SIM card, for example, a personal identification number (PIN), an unlock key (PUK), billing rate, and so on;

Phone number directory, provided to the user as a changeable memory module, so as to enable the user to store the phone number input at any time.

Currently, SIM cards mainly are hard SIM cards, where the hard SIM card is a smart card constituted by a hardware circuit. With the rapid development of the computer technology, the soft SIM appeared in the prior art, where the soft SIM card mainly is a virtual SIM card which realizes the communication function of the hard SIM card through computer software. In the prior art, the soft SIM card is mainly realized by storing all the information originally set in a hard SIM in a soft SIM card file by the operator issuing the SIM card through documenting the information, when issuing the card to a user, the operator only needs to provide the soft SIM card file to the user, and the user only needs to start and run the soft SIM card file through a preset soft SIM card application at the terminal, and then a hard SIM card is realized, thereby realizing communications between the terminal and the network.

During the research process of the present invention, the inventor has found that the prior art at least has the following defects:

since the realization of the soft SIM card in the prior art is all based on documenting the information of the hard card, if the terminal is lost or mobile phone files are copied, any other user who obtains the soft SIM card file on the terminal can realize mobile phone communication, there are risks of being illegally used, and there are serious security risks.

SUMMARY

A first purpose of embodiments of the present invention is to provide a method for activating a soft SIM card, applying the technical solution is beneficial for improving the application security of the soft SIM card.

A second purpose of embodiments of the present invention is to provide a method for a soft SIM card to join a network, applying the technical solution is beneficial for improving the application security of the soft SIM card.

A third purpose of embodiments of the present invention is to provide a method for a soft SIM card to join a network, applying the technical solution is beneficial for improving the application security of the soft SIM card.

A forth purpose of embodiments of the present invention is to provide a method for a soft SIM card to join a network, applying the technical solution is beneficial for improving the application security of the soft SIM card.

A fifth purpose of embodiments of the present invention is to provide a terminal, applying the terminal is beneficial for improving the application security of a soft SIM card in the terminal.

A sixth purpose of embodiments of the present invention is to provide a network access device, applying the terminal is beneficial for improving the application security of a soft SIM card.

A seventh purpose of embodiments of the present invention is to provide a network access device, applying the terminal is beneficial for improving the application security of a soft SIM card.

An eighth purpose of embodiments of the present invention is to provide a network access device, applying the terminal is beneficial for improving the application security of a soft SIM card in the terminal.

A ninth purpose of embodiments of the present invention is to provide a network access device, applying the terminal is beneficial for improving the application security of the soft SIM card.

A tenth purpose of embodiments of the present invention is to provide a network access device, applying the terminal is beneficial for improving the application security of a soft SIM card.

In a first aspect, embodiments of the present invention provide a method for activating a soft SIM card, including:

acquiring information on a terminal in which a soft SIM card is located of a bounding object corresponding to the soft SIM card, based on information of the soft SIM card;

generating first key information based on information of the soft SIM card and the information on the terminal in which the soft SIM card is located of the bounding object and according to a predefined encryption policy;

comparing whether the first key information is consistent with preset key information corresponding to the soft SIM card or not, if consistent, allowing an activation of the soft SIM card, so as to enable a user to perform network communication via the soft SIM card;

wherein the preset key information corresponding to the soft SIM card is: key information which is generated based on the information of the soft SIM card and preset information of each bounding object by the operator of the soft SIM card and according to the predefined encryption policy, and is provided to the user.

In a first implementation combined with the first aspect, the step: generating the first key information based on the information of the soft SIM card and the information on the terminal in which the soft SIM card is located of the bounding object, includes:

generating the first key information based on an identity of the soft SIM card and the information on the terminal in which the soft SIM card is located of the bounding object.

In a third implementation combined with the first implementation of the first aspect, the step: generating the first key information based on the information of the soft SIM card and the information on the terminal in which the soft SIM card is located of the bounding object, includes:

generating the first key information based on an identity of the soft SIM card, authentication and encryption information of the soft SIM card, and the information on the terminal in which the soft SIM card is located of the bounding object.

In a forth implementation combined with the first implementation of the first aspect, the identity of the soft SIM card comprises: a calling number of the soft SIM card, and/or an international mobile subscriber identification number of the soft SIM card.

In a fifth implementation combined with the first implementation of the first aspect, the bounding object is null, or includes any one or a combination of the following:

the terminal in which the soft SIM is located, a second SIM card in the terminal;

the information on the terminal in which the soft SIM card is located of the bounding object is null, or, the information on the terminal in which the soft SIM card is located of the bounding object comprises any one of the following, or a combination of any two or more than two of the following:

an identity of the terminal, an identity of the second SIM card, authentication and encryption information of the second SIM card.

In a sixth implementation combined with the first implementation of the first aspect, the identity of the terminal includes: an international mobile equipment identity of the terminal;

the identity of the second SIM card includes any one or a combination of the following:

an international mobile subscriber identification number, a calling number of the second SIM card.

In a seventh implementation combined with the first implementation of the first aspect, the second SIM card is: a hard SIM card.

In an eighth implementation combined with the first implementation of the first aspect, the step: acquiring the information on the terminal in which the soft SIM card is located of the bounding object corresponding to the soft SIM card, includes:

if the bounding object corresponding to the soft SIM card cannot be determined by reading the information of the soft SIM card, then:

reading an identity of the terminal, and/or information of a second SIM card in the terminal, respectively, taking any one or a combination of the following information: the identity of the terminal, and/or the information of the second SIM card in the terminal, as information of each optional bounding object respectively, generating each piece of contrastive key information, respectively, based on the information of the soft SIM card combined with the information of each of the optional bounding object respectively and according to a predefined encryption policy, comparing whether each piece of the contrastive key information is consistent with the preset key information corresponding to the soft SIM card or not, if consistent, taking the information of the optional bounding object corresponding to the contrastive key information as: the information on the terminal in which the soft SIM card is located of the bounding object corresponding to the soft SIM card.

In a ninth implementation combined with the first implementation of the first aspect, the step: acquiring the information on the terminal in which the soft SIM card is located of the bounding object corresponding to the soft SIM card, includes:

reading the information of the soft SIM card, determining a designated bounding object of the soft SIM card, and reading the information on the terminal in which the soft SIM card is located of the designated bounding object.

In a second aspect, embodiments of the present invention provides a method, including:

receiving a network-joining request transmitted by a soft SIM card;

acquiring authentication and encryption information corresponding to the soft SIM card based on an identity of the soft SIM card in the network-joining request;

generating an encryption factor, and transmitting the encryption factor to the soft SIM card;

generating network key information based on the encryption factor, the identity of the soft SIM card, and the authentication and encryption information corresponding to the soft SIM card and according to a predefined encryption policy;

receiving terminal key information fed back by the soft SIM card, wherein the terminal key information is generated by a terminal in which the soft SIM card is located based on the encryption factor, the identity of the soft SIM card and authentication and encryption information of a second SIM card in the terminal and according to the predefined encryption policy;

comparing whether the network key information is consistent with the terminal key information or not, if consistent, allowing the soft SIM card joining the network.

In a first implementation combined with the second aspect, the identity of the soft SIM card comprises any one or a combination of the following: an international mobile subscriber identification number of the soft SIM card, a calling number of the soft SIM card.

In a second implementation combined with the first implementation of the second aspect, before the step: acquiring the authentication and encryption information corresponding to the soft SIM card, the method further includes:

acquiring authentication and encryption information of a bound SIM card from a home network of the bound SIM card based on information of the bound SIM card preset for the soft SIM card by a user of the soft SIM card;

taking the authentication and encryption information of the bound SIM card as: the authentication and encryption information of the soft SIM card.

In a third implementation combined with the first implementation of the second aspect, the bound SIM card is: a hard SIM card.

In a forth implementation combined with the first implementation of the second aspect, the second SIM card is a hard SIM card.

In a fifth implementation combined with the first implementation of the second aspect, the encryption factor is: a random number.

In a third aspect, embodiments of the present invention provides a method for a soft SIM card to join a network, including:

receiving a network-joining request transmitted by a user;

if it is determined that a transmitting end of the network-joining request is a soft SIM card based on the network-joining request, then:

determining each designated bounding object of the soft SIM card based on an identity of the soft SIM card in the network-joining request, and acquiring stored information of each of the designated bounding object;

acquiring information on a terminal in which the soft SIM card is located of each of the designated bounding object;

comparing whether the stored information of each of the designate bounding object is consistent with the information on the terminal in which the soft SIM card is located of each of the designated bounding object or not, if consistent, then allowing the soft SIM card joining the network.

In a first implementation combined with the first implementation of the third aspect, the step: determining each of the designated bounding object of the soft SIM card based on the identity of the soft SIM card in the network-joining request, and acquiring the stored information of each of the designated bounding object, includes:

querying a soft card server based on the identity of the soft SIM card in the network-joining request, and acquiring stored information of each of the designated bounding object corresponding to the soft SIM card.

In a second implementation combined with the first implementation of the third aspect, the designated bounding object is: an identity of a terminal;

the step: acquiring the information on the terminal in which the soft SIM card is located of each of the designated bounding object, comprises:

transmitting a terminal side information reporting instruction to the soft SIM card, instructing the soft SIM card to report the identity of the terminal in which the soft SIM card is located;

receiving a first reporting message fed back by the soft SIM card, acquiring the identity of the terminal in which the soft SIM card is located included in the first reporting message;

the step: comparing whether the stored information of each of the designate bounding object is consistent with the information on the terminal in which the soft SIM card is located of each of the designated bounding object or not, comprises:

comparing whether an identity of a bound terminal which is pre-stored for the soft SIM card is consistent with the identity of the terminal in which the soft SIM card is located or not.

In a third implementation combined with the first implementation of the third aspect, the designated bounding object is: an identity of a second SIM card;

the step: acquiring the information on the terminal in which the soft SIM card is located of each of the designated bounding object, comprises:

transmitting a terminal side information reporting instruction to the soft SIM card, instructing the soft SIM card to report the identity of the terminal in which the soft SIM card is located;

the step: comparing whether the stored information of each of the designate bounding object is consistent with the information on the terminal in which the soft SIM card is located of each of the designated bounding object or not, comprises:

comparing whether an identity of a bound terminal which is pre-stored for the soft SIM card is consistent with the identity of the terminal in which the soft SIM card is located or not.

In a fourth implementation combined with the first implementation of the third aspect, the designated bounding object is: an identity of a hard SIM card, and an identity of a terminal;

the step: acquiring the information on the terminal in which the soft SIM card is located of each of the designated bounding object, comprises:

transmitting a terminal side information reporting instruction to the soft SIM card, instructing the soft SIM card to report the identity of the terminal in which the soft SIM card is located;

the step: comparing whether the stored information of each of the designate bounding object is consistent with the information on the terminal in which the soft SIM card is located of each of the designated bounding object or not, comprises:

comparing whether an identity of a bound hard SIM card which is pre-stored for the soft SIM card is consistent with the identity of the hard SIM card in the terminal in which the soft SIM card is located or not, and comparing whether an identity of a bound terminal which is pre-stored for the soft SIM card is consistent with the identity of the terminal in which the soft SIM card is located or not.

In a fifth implementation combined with the first implementation of the third aspect, after the step: acquiring the identity of the terminal in which the soft SIM card is located included in the first reporting message, the method further includes:

taking the identity of the terminal in which the soft SIM card is located included in the first reporting message as reporting information of the soft SIM card, and storing in a soft card server.

In a sixth implementation combined with the first implementation of the third aspect, after the step: allowing the soft SIM card joining the network, the method further includes:

receiving a network-quiting request transmitted by the user;

deleting the reporting information of the soft SIM card in the soft card server based on the identity of the soft SIM card in the network-quiting request.

In an seventh implementation combined with the first implementation of the third aspect, after the step: receiving the network-joining request transmitted by the user, the method further includes:

if it is determined that a transmitting end of the network-joining request is a hard SIM card based on the network-joining request, and the hard SIM card is preset to be in correspondence with any designated soft SIM card, the method further comprises:

acquiring information of the designated soft SIM card, and determining each designated bounding object of the designated soft SIM card based on the information of the designated soft SIM card;

acquiring information on the terminal in which the hard SIM card is located of each of the designated bounding object corresponding to the information of the designated soft SIM card;

taking the information on the terminal in which the hard SIM card is located of each of the designated bounding object and information of the hard SIM card as reporting information of the hard SIM card, storing in a soft card server, wherein the reporting information of the hard SIM card is in correspondence with an identity of the designated soft SIM card in the soft card server;

allowing the hard SIM card joining the network.

In an eighth implementation combined with the first implementation of the third aspect, the designated bounding object is: an identity of the hard SIM card, or an identity of a terminal and an identity of the hard SIM card, the step: acquiring information on the terminal in which the hard SIM card is located of each of the designated bounding object corresponding to the information of the designated soft SIM card, comprises:

acquiring the identity of the hard SIM card based on the network-joining request;

transmitting the terminal side information reporting instruction to the hard SIM card, and instructing the hard SIM card to report the identity of the terminal in which the hard SIM card is located;

receiving a second reporting message fed back by the hard SIM card, acquiring an identity of the terminal in which the hard SIM card is located included in the second reporting message.

In a ninth implementation combined with the first implementation of the third aspect, after the step: allowing the hard SIM card joining the network, the method further includes:

receiving a network-quiting request transmitted by the user;

deleting reporting information of the hard SIM card in the soft card server based on the identity of the hard SIM card in the network-quiting request.

In a tenth implementation combined with the first implementation of the third aspect, an identity of the hard SIM card comprises any one or a combination of the following: an international mobile subscriber identification number of the hard SIM card, a calling number of the hard SIM card;

an identity of the terminal includes: an international mobile equipment identity of the terminal.

In an eleventh implementation combined with the first implementation form of the third aspect, the identity of the soft SIM card comprises any one or a combination of the following: an international mobile subscriber identification number of the soft SIM card, a calling number of the soft SIM card.

In a forth aspect, embodiments of the present invention provide a method for a soft SIM card to join a network, which includes:

generating first key information based on an identity of a soft SIM card, and authentication and encryption information of a second SIM card in a terminal in which the soft SIM card is located and according to a predefined encryption policy;

comparing whether the first key information is consistent with preset key information corresponding to the soft SIM card or not, if consistent, then:

transmitting, by the soft SIM card, a network-joining request to a network;

receiving an encryption factor issued by the network;

generating terminal key information based on the encryption factor, the identity of the soft SIM card, and the authentication and encryption information of the second SIM card and according to the predefined encryption policy;

reporting the terminal key information to the network, to enable the network to compare whether the terminal key information is consistent with network key information generated at the network side, so as to determine whether or not to allow the terminal joining the network;

the network key information is generated based on the encryption factor, the identity of the soft SIM card and authentication and encryption information corresponding to the soft SIM card pre-stored in the network and according to the predetermined encryption policy;

receiving a network-joining response of the network, if a result of the network-joining response is: allowing network-joining, then the soft SIM card joins the network.

In a fifth aspect, embodiments of the present invention provide a terminal, which includes:

a reading unit, configured to read information of a soft SIM card in the terminal, and acquire information on the terminal of a bounding object corresponding to the soft SIM card based on the information of the soft SIM card;

an encrypting unit, configured to generate first key information based on the information of the soft SIM card and the information of the bounding object and according to a predefined encryption policy;

a comparing unit, configured to compare whether the first key information is consistent with preset key information corresponding to the soft SIM card or not, wherein the preset key information corresponding to the soft SIM card is: key information generated based on the information of the soft SIM card and preset information of each bounding object by the operator of the soft SIM card and according to the predefined encryption policy, and provided to a user;

an antenna, configured to transmit information to a network, and receive information transmitted by the network, wherein, the information transmitted to the network comprises: when the first key information is consistent with the preset key information corresponding to the soft SIM card, transmitting a network-joining request to the network.

In a first implementation combined with the first implementation of the fifth aspect, the terminal further includes:

a storing unit, configured to store information, the stored information includes: information of the soft SIM card, the information of the soft SIM card includes: an identity of the soft SIM card, the preset key information corresponding to the soft SIM card.

In a sixth aspect, embodiments of the present invention provide a network access device, which includes:

a storing unit, configured to store information of a soft SIM card, wherein the information of the soft SIM card comprises an identity of the soft SIM card, and authentication and encryption information corresponding to the soft SIM card;

a first authenticating and encrypting unit, configured to, under control of a controlling unit, generate and transmit an encryption factor to a user, and generate network key information based on the encryption factor, the identity of the soft SIM card stored in the storing unit, and the authentication and encryption information corresponding to the soft SIM card and according to a predefined encryption policy corresponding to the SIM card, and compare whether the network key information is consistent with terminal key information fed back by the soft SIM card or not, if consistent, then feed back a result of authentication to the controlling unit: authentication passed;

the terminal key information is generated by a terminal in which the soft SIM card is located based on the encryption factor, the identity of the soft SIM card and authentication and encryption information of a second SIM card in the terminal and according to the predefined encryption policy;

the controlling unit, configured to control the first authenticating and encrypting unit, and control an operation of an access unit based on feedback of the first authenticating and encrypting unit;

the access unit, configured to provide network access for the SIM card under control of the controlling unit.

In a first implementation combined with the first implementation of the sixth aspect, the information of the soft SIM card stored in the storing unit, further comprises: information of a bound SIM card which is preset for the soft SIM card by a user of the soft SIM card, and authentication and encryption information of the bound SIM card, the authentication and encryption information of the bound SIM card is stored as: authentication and encryption information corresponding to the soft SIM card.

In a second implementation combined with the first implementation of the sixth aspect, the network access device further includes:

a shared querying unit, configured to query to get authentication and encryption information of the bound SIM card from a home network of the bound SIM card based on the information of the bound SIM card, and store the authentication and encryption information of the bound SIM card to the storing unit.

In a third implementation combined with the first implementation of the sixth aspect, the information of the soft SIM card stored in the storing unit further includes: stored information of a designated bounding object corresponding to the soft SIM card;

the network access device further includes:

a second authenticating and encrypting unit, which is electrically connected to the controlling unit, and is configured to perform further authentication processing under control of the controlling unit, wherein the authentication processing comprises: after the authentication of the first authenticating and encrypting unit is passed, the second authenticating and encrypting unit is configured to further compare whether information on a terminal in which the soft SIM card is located of each of the designated bounding object information corresponding to the soft SIM card is consistent with the stored information of the designated bounding object corresponding to the soft SIM card stored in the storing unit or not, if consistent, then feed back a result of authentication to the controlling unit: authentication passed;

wherein the controlling unit is configured to control the access unit to provide network access for the SIM card after receiving the results, which are both authentication passed, of authentication of the first comparing unit and the second authenticating and encrypting unit.

In a seventh aspect, embodiments of the present invention provide a terminal, including:

a reader, configured to read information of a soft SIM card in the terminal, and based on the information of the soft SIM card, acquire information on the terminal of a bounding object corresponding to the soft SIM card based on the information of the soft SIM card, and input to an encryptor;

the encryptor, which is electrically connected to the reader, and is configured to generate first key information based on the information of the soft SIM card and the information of the bounding object and according to a predefined encryption policy, and input to a comparator;

the comparator, configured to compare whether the first key information input by the encryptor is consistent with preset key information corresponding to the soft SIM card or not, wherein the preset key information corresponding to the soft SIM card is: key information which is generated based on the information of the soft SIM card and preset information of each bounding object and according to the predefined encryption policy by an operator of the soft SIM card, and is provided to a user;

an antenna, which is electrically connected to the comparator, and is configured to transmit information to a network, and receive information from the network, wherein, the information transmitted to a network comprises: when the comparator determines that the first key information is consistent with the preset key information corresponding to the soft SIM card, transmitting a network-joining request to the network.

In a first implementation combined with the first implementation form of the seventh aspect, the terminal further includes: a memory, which is electrically connected to the reader, and is configured to store information, wherein the stored information comprises: the information of the soft SIM card, the information of the soft SIM card includes: an identity of the soft SIM card, the preset key information corresponding to the soft SIM card.

In an eighth aspect, embodiments of the present invention provide a network access device, including:

a memory, configured to store information of a soft SIM card, wherein the information of the soft SIM card comprises an identity of the soft SIM card, and authentication and encryption information corresponding to the soft SIM card;

a first authenticating encryptor, which is electrically connected to the memory and a controller, and is configured to generate and transmit an encryption factor to a user under the control of the controller, and generate network key information based on the encryption factor, the identity of the soft SIM card stored in the storing unit, and the authentication and encryption information corresponding to the soft SIM card and according to a predetermined encryption policy corresponding to the SIM card, and compare whether the network key information is consistent with terminal key information fed back by the soft SIM card or not, if consistent, then feed back a result of authentication to the controller: authentication passed;

the terminal key information is generated by to terminal in which the soft SIM card is located, based on the encryption factor, the identity of the soft SIM card and authentication and encryption information of a second SIM card in the terminal, and according to the predetermined encryption policy;

the controller, which is electrically connected to the memory, the first authenticating encryptor, and an accessor, respectively, and is configured to control the first authenticating encryptor and control an operation of an accessor based on feedback of the first authenticating encryptor;

the accessor, which is electrically connected to the controller, and is configured to provide network access for the SIM card under control of the controller.

In a first implementation combined with the first implementation of the eighth aspect, the information of the soft SIM card stored in the memory, further comprises: information of a bound SIM card preset for the soft SIM card by a user of the soft SIM card, and authentication and encryption information of the bound SIM card, the authentication and encryption information of the bound SIM card is stored as: authentication and encryption information corresponding to the soft SIM card.

In a second implementation combined with the first implementation of the eighth aspect, the network access device further includes:

a shared querier, which is electrically connected to the controller and the memory, and is configured to query to get authentication and encryption information of the bound SIM card from a home network of the bound SIM card based on the information of the bound SIM card, and store the authentication and encryption information of the bound SIM card to the memory.

In a third implementation combined with the first implementation of the eighth aspect, the information of the soft SIM card stored in the memory further includes: stored information of a designated bounding object corresponding to the soft SIM card;

the network access device further includes:

a second authenticating encryptor, which is electrically connected to the controller and the memory respectively, and is configured to perform further authentication processing under control of the controlling unit, wherein the authentication processing comprises: after the authentication of the first authenticating and encrypting unit is passed, the second authenticating and encrypting unit is configured to further compare whether information on a terminal in which the soft SIM card is located of each of the designated bounding object information corresponding to the soft SIM card is consistent with the stored information of the designated bounding object corresponding to the soft SIM card stored in the memory or not, if consistent, then feed back a result of authentication to the controlling unit: authentication passed;

wherein the controller is configured to control the accessor to provide network access for the SIM card after receiving the results, which are both authentication passed, of authentication of the first comparor and the second authenticating encryptor.

It can be seen from the above that, applying the technical solution of this embodiment, when using the SIM card, when determining whether the user have the validation of using this soft SIM card to perform communication applications, not only based on the information of the soft SIM card, but also based on the information on the terminal in which the soft SIM card is located of each of the bounding object corresponding to the soft SIM card, and according to the predefined authentication policy, then whether the present user is a valid user of the soft SIM card or not is determined.

Applying this embodiment technical solution, only when all the information of the soft SIM card, the information on the terminal of each bounding object of the soft SIM card, and the predetermined authentication algorithm are in full compliance with that predefined by the user, can the user be determined to be a legal user of the soft SIM card.

In this way, even though the user acquires the information of the soft SIM card and the authentication algorithm of the soft SIM card, but if the information of each bounding object at the user terminal side is not consistent with the user settings, the user will be judged as an illegal user of the soft SIM card by applying the technical solution of this embodiment. For example, in the following scenario, an SD card in which the user stores the soft SIM card information is lost, the bounding object set when the user applied the SIM card account is a calling number of another hard SIM card: 137**5052, after a second user picks up this SD card, as long as the second user does not have the hard SIM card of which the calling number is: 137**5052, the second user cannot use the soft SIM card in any other terminal.

It can be seen from the above that, compared with the prior art, applying the technical solutions of embodiments are beneficial for greatly improving the application security of the soft SIM card.

BRIEF DESCRIPTION OF DRAWINGS

To describe the technical solutions in embodiments of the present invention or in the prior art more clearly, the following briefly introduces the accompanying drawings needed for describing the embodiments. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

The following clearly and comprehensively describes the technical solutions in embodiments of the present invention with reference to the accompanying drawings in embodiments of the present invention. Apparently, the described embodiments are merely a part rather than all embodiments of the present invention. All other embodiments obtained by persons of ordinary skill in the art based on embodiments of the present invention without creative effort shall fall within the protection scope of the present invention.

Embodiment 1

Figure 1:
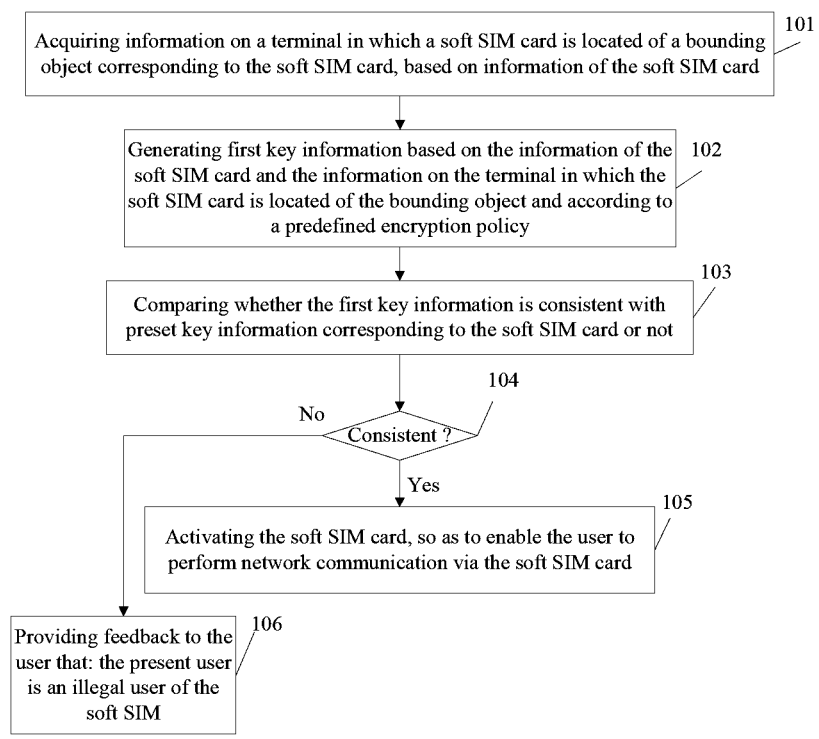
FIG. 1 is a schematic flowchart of a method for activating a soft SIM card according to embodiment 1 of the present invention.

Referring to FIG. 1, a method for activating a soft SIM card provided by this embodiment mainly includes the following process:

Step 101: Acquiring information on a terminal in which a soft SIM card is located of a bounding object corresponding to the soft SIM card, based on information of the soft SIM card.

At the terminal side, the terminal reads a soft SIM card (the soft SIM card file) provided by an operator of the soft SIM card to the user, and acquires information on a terminal in which the soft SIM card is located of a bounding object corresponding to the present soft SIM card based on a predefined bound type.

During an issuance of the soft SIM card, the user provides a soft SIM card account application to the operator through a network or a short message or going to a business hall of the operator and so on, when submitting the application, the user may provide user information, such as the user's name, the user's address, a SIM card binding type currently designated by the user, and information of an actual bounding object.

After receiving the soft SIM card account application of the user, the operator generates information of the soft SIM card based on the application of the user, and encapsulates the information in a soft SIM card file, where the soft SIM information includes: an identity of the soft SIM card, (the identity may be but not limited to an IMSI), and other SIM related information such as an original personal identification number (referred to as PIN) and an original unblocking key (PIN UnBlock, referred to as PUK) and so on.

Further, the operator generates key information corresponding to the soft SIM card based on the binding type designated by the user, the information of the designated bounding object, and the information of the soft SIM card and according to a predetermined encryption policy. The binding type designated by the user and the information of the bounding object designated by the user, which are taken as basis during the process of generating the key information corresponding to the soft SIM card, may be defined by the user, for example, the binding type designated by the user may be but not limited to:

1. The soft SIM card is bound to a hard SIM card designated by the user, then the provided information of actual bounding object under this circumstance is hard SIM card information, the provided hard SIM card information may be but not limited to a calling number of the hard SIM card, or an IMSI of the hard SIM card. Under this circumstance, when the operator performs encryption arithmetic, the input information of the bounding object is: the calling number or the IMSI of the hard SIM card of a terminal designated by the user.

2. The soft SIM card is bound to a terminal designated by the user, then the provided information of actual bounding object under this circumstance is terminal information, the provided terminal information may be but not limited to a terminal number of the terminal, where an international mobile equipment identity (referred to as IMEI) may be used as the terminal number. Under this circumstance, when the operator performs encryption arithmetic, the input information of the bounding object is: the IMEI of the terminal designated by the user.

3. The soft SIM card is bound to a terminal designated by the user and a designated hard SIM card, then the provided information of actual bounding object under this circumstance is terminal information and information of the designated hard SIM card, an IMEI of the terminal, and a calling number or an IMSI of the hard SIM card may be simultaneously provided. Under this circumstance, when the operator performs encryption arithmetic, the input information of the bounding object is: the IMEI of the terminal designated by the user, and the calling number or the IMSI of the hard SIM card.

4. The soft SIM card is not bound to any bounding object, that is, when the operator performs encryption arithmetic, input information of the bounding object is null.

After generating the SIM card information, the operator generates key information based on the currently generated information of the soft SIM card, and preset information predetermined for each bounding object by the user and according to a predetermined encryption policy, where the key information generated based on a user setting by the operator is marked as: preset key information corresponding to the soft SIM card.

After generating the information of the soft SIM card and the preset key information corresponding to the soft SIM card, the operator provides both the information of the soft SIM card and the key information corresponding to the soft SIM card to the user, that is, provides the soft SIM card to the user, so that the user can realize the application of the soft SIM card by applying and reading a file corresponding to the soft SIM card provided by the operator at the terminal. Here the way of providing to the user may be but not limited to transmitting through a network or transmitting through a short message, or providing to the user in the form of network download, or in the form of a memory card.

After the user receives the soft SIM card provided by the operator, the file of the soft SIM card provided by the operator is read at the terminal, information of the binding type of the soft SIM card is determined based on the information in the soft SIM card, and actural information on the terminal in which the soft SIM card is located of the bounding object corresponding to the soft SIM card is acquired.

For example: the current bounding object is a hard SIM card, then the terminal reads information of the hard SIM card of the terminal at the present terminal, and takes the read information as: the information on the terminal in which the present soft SIM card is located of a corresponding bounding object.

For another example: the current bounding object is a terminal, then the terminal reads a terminal number, such as an international mobile equipment identity (referred to as IMEI) of the present terminal at the present terminal, and takes the read information as: the information on the terminal in which the present soft SIM card is located of a corresponding bounding object.

For another example: the current bounding object is null, then the information on the terminal in which the present soft SIM card is located of a corresponding bounding object is null.

For another example: the current bounding object is a terminal and a hard SIM card, then the terminal reads an IMEI of the present terminal and a calling number and/or an IMSI of the hard SIM card at the terminal, and takes the read IMEI of the terminal and the calling number and/or the IMSI of the hard SIM card as: the information on the terminal in which the present soft SIM card is located of a corresponding bounding object.

In this step, when determining the bounding object corresponding to the soft SIM card based on the information of the soft SIM card, the following methods may be adopted, but it is not limited:

Method one: if the information of the designated bounding object corresponding to the soft SIM card is already included in the soft SIM card file, the soft SIM card file may be directly read, acquire the information of the designated bounding object corresponding to the soft SIM card encapsulated in the file, then directly read the present terminal, read and acquire the information on the present terminal of each designated bounding object. For example, if it is indicated in the soft SIM card file that: the designated bounding object corresponding to the soft SIM card is the IMEI of the terminal, then directly read the terminal, acquire a local IMEI of the terminal, the local IMEI of the terminal is the information on the terminal in which the present soft SIM card is located of the bounding object corresponding to the soft SIM card.

Method two: if the information of the designated bounding object corresponding to the soft SIM card is not included in the soft SIM card file, under this circumstance, it is not possible to acquire the information of the designated bounding object corresponding to the soft SIM card encapsulated in the file by reading the soft SIM card file. The following technical solution may be adopted:

First, respectively read the terminal, acquire an identity of the terminal (such as IMEI), and/or information of a second SIM card (generally is but not limited to a hard SIM card) in the terminal.

Then, take any one or a combination of the following information: the identity of the terminal, and/or the information of the second SIM card as the information of optional bounding object respectively, and get information of several optional bounding objects.

And then, according to a predetermined encryption policy, based on the information of the soft SIM card, combine the information of any one of the optional bounding objects respectively, and generate each piece of contrastive key information respectively. For example, if there are information of 4 optional bounding objects, then 4 pieces of contrastive key information may be generated, and each piece of the contrastive key information is in correspondence with information of each optional bounding object respectively.

Finally, after each piece of contrastive key information is generated, respectively compare whether the contrastive key information generated each time is consistent with a first key information designated by the operator or not, if it is consistent, then take the information of the optional bounding object corresponding to the contrastive key information as: the information on the terminal in which the present soft SIM card is located of the bounding object corresponding to the current soft SIM card. For example:

Suppose that the information of the current optional bounding object is: the IMEI of the terminal, the calling number of the hard SIM card, a combination of the IMEI of the terminal and the calling number of the hard SIM card, suppose that the contrastive key information, which is generated according to a predetermined encryption policy and based on the information of the soft SIM card in combining of the IMEI of the terminal and the calling number of the hard SIM card, is consistent with preset key information corresponding to the soft SIM card, then determine that the bounding object corresponding to the soft SIM card should be: the combination of the IMEI of the terminal and the calling number of the hard SIM card.

By adopting the method two, the information of the bounding object corresponding to the soft SIM card can be determined through a method of exhaustion in the case that the soft SIM file does not indicate the bounding object corresponding to the soft SIM card, which further facilitate the user's usage, reduces the user setting information included in the soft SIM card file, and is beneficial for further improving the application security of the soft SIM card.

Step 102: Generating first key information based on the information of the soft SIM card and the information on the terminal in which the soft SIM card is located of the bounding object and according to a predefined encryption policy.

After acquiring the information on the terminal in which the soft SIM card is located of the bounding object corresponding to the soft SIM card, the terminal further generates first key information based on the information of the soft SIM card and the information on the terminal of the bounding object corresponding to the soft SIM card and according to an encryption algorithm corresponding to the current soft SIM card which is pre-stored in the soft SIM card file or provided to the terminal through other ways by the operator (marked as the predetermined encryption policy).

Here, when performing the encryption, according to the predetermined encryption algorithm, all, or any one of, or a combination of multiple pieces of information of the soft SIM card: authentication and encryption information of the soft SIM card, an identity of the soft SIM and other information, are used in the encryption.

The identity of the soft SIM card may include but not limited to any one or a combination of the following: the calling number of the soft SIM card, the IMSI of the soft SIM card, the authentication and encryption information of the soft SIM card (if the SIM information of the user's SIM file provided by the user includes this information, the authentication and encryption information of the soft SIM card may specifically include but not limited to an authentication key of the soft SIM and an authentication encryption algorithm, and so on).

Here, when performing the encryption, based on the predetermined encryption algorithm, the information on the terminal in which the soft SIM card is located of the bounding object which is used in the encryption may be null, or, the information on the terminal in which the soft SIM card is located of the bounding object which is used in the encryption may further include but not limited to any one or a combination of two or more than two of the following: the identity of the terminal (the identity may be but not limited to: IMEI), the identity (such as calling number and/or IMSI) of another SIM card or other several SIM cards in the terminal (hereinafter termed as the second SIM card), and authentication and encryption information of the second SIM card (acquired by reading the second SIM card in the terminal).

Step 103: Comparing whether the first key information is consistent with preset key information corresponding to the soft SIM card or not.

After the terminal acquires the first key information by performing encryption based on the information of the soft SIM card and information on the terminal of the corresponding bounding object and according to the predetermined encryption algorithm designated or provided by the operator in step 102, the terminal compares the locally acquired first key information with the preset key information corresponding to the soft SIM card, to determine whether the two pieces of information are consistent.

The preset key information corresponding to the soft SIM card may be provided to the user by the SIM card operator by way of pre-encapsulating the preset key information in the soft SIM card file and delivering the memory card, and may also be but not limited to be provided to the user by the SIM card operator by way of network tranmitting or data sharing and so on.

Step 104: If it is consistent, then performing step 105; otherwise, the method may end or may further include but not limited to performing step 106.

If the first key information acquired by the terminal through local encryption is consistent with the preset key information corresponding to the soft SIM card designated or provided by the operator, then it may be determined that in the present terminal, besides that the soft SIM card is the soft SIM card provided by the operator, the actual bounding object in the terminal is the bounding object actually designated by the user, the information on the terminal of the bounding object is completely consistent with the information preset by the user when the user opens an account, it may be determined that the present user is a legal user of the soft SIM card, step 105 is performed, the terminal allows activation of the soft SIM card, otherwise, it is determined that the present user is an illegal user of the soft SIM card, the terminal forbids the activation of the soft SIM card.

Step 105: Activating the soft SIM card, so as to enable the user to perform network communication via the soft SIM card.

When it is determined that the present user is a legal user of the soft SIM card, the terminal allows the activation of the soft SIM card, so that the soft SIM card starts a network-joining process, joins the network, realizes the application of the soft SIM card, so as to enable the user to perform network communication via the soft SIM card.

Step 106: Providing feedback to the user that: the present user is an illegal user of the soft SIM.

When it is determined that the present user is an illegal user of the soft SIM card, besides stopping further operation to the soft SIM card and forbidding the activation of the soft SIM card, this step may also be performed, so as to inform the present user that: this user is an illegal user of the soft SIM and does not have permissions to use the soft SIM card, which further improves the user experience.

It can be seen from the above that, applying the technical solution of this embodiment, in this embodiment, after installing the soft SIM card in the terminal, when activating the soft SIM card, the terminal determines the bounding object of the soft SIM card based on the information of the soft SIM card in the terminal, reads information on the terminal of each of the bounding object, performs encryption arithmetic in the terminal to obtain the first key information based on a predetermined encryption policy combined with the information of the soft SIM card and information on the terminal of each of the bounding object, compares the first key information obtained through the encryption described in this paragraph with the key information previously provided to the user by the operator of the soft SIM card, if the two are consistent, then determines that the present user is a legal user of the soft SIM card, allows the activation of the soft SIM card, so as to enable the user to perform network communication applying the soft SIM card.

Since during the generation of the first key information through the local encryption, besides using the predetermined encryption algorithm and the information of the soft SIM card, the information on the terminal of the bounding object of the soft SIM card (that is the terminal information) is also combined with, thus, as long as any one of the three: the encryption algorithm, the information of the soft SIM card and the terminal information, is not consistent with which was preset at the operator side when the user get the soft SIM card, then the first key information generated through the encryption will be not consistent with the key information generated by the operator based on the information of the soft SIM card and the preset information of each of the bounding object and according to the predetermined encryption policy, that is, the terminal will determine that the present user is an illegal user of the soft SIM card, forbids the activation of the soft SIM card, thereby avoiding the soft SIM card being used illegally.

It can be seen from the above that, relative to the prior art, applying the technical solution of this embodiment is beneficial for greatly improving the application security of the soft SIM card, and is beneficial for the popularization and application of the soft SIM card, thereby making full use of the advantages of being easy to use of the soft SIM card.

Embodiment 2

Figure 2:
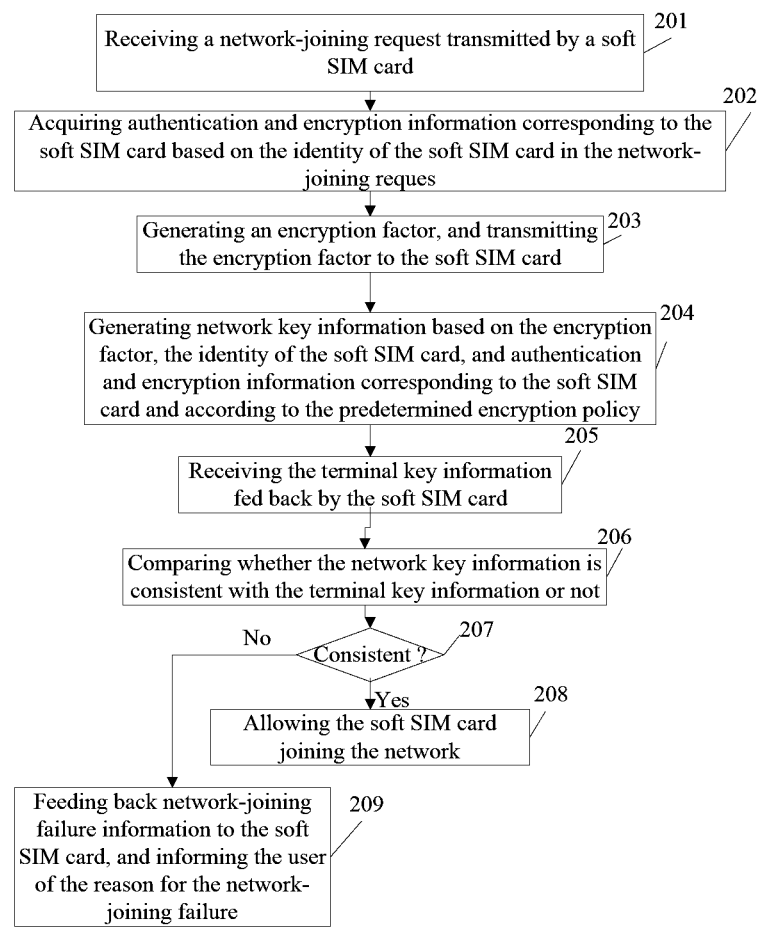
FIG. 2 is a schematic flowchart of a method for a soft SIM card to join a network according to embodiment 2 of the present invention.

Referring to FIG. 2, this embodiment provides a method for a soft SIM card to join a network, the method mainly includes the following process:

Step 201: Receiving a network-joining request transmitted by a soft SIM card.

A precondition for a user to perform network communication using the SIM card is that, the SIM card should join the network (referred to as network-joining), only then the network communication may be performed using the SIM card, the same goes for the soft SIM card.

When the SIM card joins the network, specifically, a network-joining request is transmitted by the SIM card to the network (specifically is the access network directly connected to the terminal, the terminal is connected to the core network through the access network), the same goes for the soft SIM card.

The soft SIM card transmits the network-joining request to the network, where the network-joining request includes an identity of the soft SIM card (for example includes but not limited to: the IMSI, or the calling number, or the IMSI and the calling number of the soft SIM card).

At the network side, after the network receives the network-joining request transmitted by the soft SIM card, the network may transmit the identity of the soft SIM card of network-joining request.

Step 202: Acquiring authentication and encryption information corresponding to the soft SIM card based on the identity of the soft SIM card in the network-joining reques.

After receiving the network-joining request, the network queries to get authentication and encryption information corresponding to the SIM card at the network side based on the identity of the soft SIM card, so as to perform the authentication and encryption process of the network-joining process by using the authentication and encryption information corresponding to the SIM card.

The authentication and encryption information corresponding to the SIM card may but not limited to be preset for the soft SIM card at the network side by the operator after receiving an account application from the user.

Step 203: Generating an encryption factor, and transmitting the encryption factor to the soft SIM card.

The network generates an encryption factor, and transmits the encryption factor to the soft SIM card, so that the terminal at the soft SIM card side performs encryption arithmetic based on the encryption factor and according to a predetermined encryption policy at the terminal side.

Here the encryption factor may be but not limited to a random number which is randomly generated by the network.

At the terminal side, after the terminal receives the encryption factor, according to the predetermined encryption policy corresponding to the soft SIM card, the terminal generates terminal key information, which is marked as terminal key information, at the terminal side based on the encryption factor issued by the network combined with the identity of the soft SIM card and the authentication and encryption information of the second SIM card (it may be but not limited to a hard SIM card) in the terminal, reports the terminal key information to the network, so that the network performs corresponding authentication processing based on the terminal key information.

Step 204: Generating network key information based on the encryption factor, the identity of the soft SIM card, and authentication and encryption information corresponding to the soft SIM card and according to the predetermined encryption policy.

At the network side, the network generates the network key information based on the predetermined encryption algorithm corresponding to the soft SIM card pre-stored in the network, based on the currently generated encryption factor, the identity of the soft SIM card, and the authentication and encryption information corresponding to the soft SIM card acquired in step 202.

In this step, the authentication and encryption information corresponding to the soft SIM card is set for the soft SIM card by the operator of the soft SIM card based on binding information designated by the legal user of the soft SIM card.

Here, the acquiring the authentication and encryption information corresponding to the soft SIM card may include but not limited to be performed according to the following process:

The user provides information of the bound SIM card (may be but not limited to the hard SIM card held by the user) corresponding to the soft SIM card, the information of the bound SIM card may be but not limited to a calling number, or an IMSI, or an IMSI and a calling number, the home network of the soft card inquires the home network of the bound SIM card based on the information of the bound SIM card, to acquire the authentication and encryption information of the bound SIM card, and stores the authentication and encryption information of the bound SIM card in the home network of the soft card as authentication and encryption information corresponding to the soft SIM card in the network, for use when the network performs the network-joining authentication process in the subsequent.

With the above process, suppose that the calling number of the bound SIM card set for the soft SIM card at the network by the user is 138****02, the home network of the bound SIM card is the mobile network, then the network inquires the mobile network which is the home network of the bound SIM card based on the calling number which is 138****02, takes the calling number as a query index, acquires the authentication and encryption information of the bound SIM card corresponding to the calling number, and takes the acquired authentication and encryption information as the authentication and encryption information corresponding to the soft SIM card in the home network of the soft SIM.

When performing the network-joining authentication and encryption process, if the SIM card of which the calling number is 138******02 does not exist in the terminal in which the soft SIM card is located, that is, the authentication and encryption information of the SIM card does not exist, then even though the terminal acquires the information and authentication algorithm of the soft SIM, it still can not obtain the terminal key information which is consistent with the network key information, the user still can not make the soft SIM card join the network to realize the communication application of the soft SIM card. It can be seen that, adopting the technical solution of this embodiment is beneficial for greatly improving the application security of the soft SIM card, thus illegal use of the soft SIM card can be avoid.

Step 205: Receiving the terminal key information fed back by the soft SIM card.

The network receives the terminal key information fed back by the soft SIM card.

The terminal key information is generated by the terminal in which the soft SIM card is located based on the encryption factor, the identity of the soft SIM card and authentication and encryption information of a second SIM card in the terminal and according to the predetermined encryption policy.

Step 206: Comparing whether the network key information is consistent with the terminal key information or not.

Step 207: If it is consistent, then performing step 208; otherwise, ending the network-joining authentication and encryption process, or may further performing step 209.

If the terminal key information reported by the terminal is consistent with the network key information generated through the network calculation, then it may be determined that the present user is a legal user of the soft SIM card, then step 208 is performed; otherwise, it is determined that the present user is an illegal user of the soft SIM card, the network-joining authentication and encryption process may be ended, or step 209 may further be performed.

In this embodiment, the terminal key information is generated not only according to the predetermined encryption algorithm corresponding to the soft SIM card of the terminal, but also by combining with the soft SIM card information of the terminal, combining with the encryption factor issued by the network, and combining with the authentication and encryption information of the second SIM card of the terminal, therefore, only in the case that all the information is the same as the preset information at the network side, it is possible to make the terminal key file consistent with the network key information, as long as any one of them is different from the preset information at the network side, then the obtained terminal key file will be not consistent with the network key information generated at the network side based on information designated by a legal user of the soft SIM card, under this circumstance, it may be determined that the user is an illegal user of the soft SIM card.

Step 208: Allowing the soft SIM card joining the network.

The network-joining application of the soft SIM card is allowed in the network-joining authentication process, then a further network-joining establishing process is entered.

Step 209: Feeding back network-joining failure information to the soft SIM card, and informing the user of the reason for the network-joining failure.

In the case that the network determines that the user is an illegal user of the soft SIM card, besides refusing the network-joining request of the soft SIM card, it may further feed back network-joining failure information to the soft SIM card, and inform the user of the reason of the network-joining failure, thereby improving the user experience and the convenience.

It can be seen from the above that, by applying the technical solution of this embodiment, since the technical solution of this embodiment is applied, when the network deals with a network-joining request of the soft SIM card, network key information is generated at the network side based on an encryption factor, an identity of a soft SIM card, and authentication and encryption information corresponding to the soft SIM card and according to a predetermined encryption policy, when performs authenticating, compares the network key information with terminal key information generated by a terminal based on the encryption factor issued by the network, an identity of the soft SIM card acquired by the terminal, and the authentication and encryption information of the second SIM card in the terminal and according to a predetermined encryption policy, if it is not consistent, then determines that the user is an illegal user of the soft SIM card.

It can be seen from the above that, by applying the technical solution of this embodiment, even though the information of the soft SIM card is acquired by the user, but if the bound SIM card designated by the legal user of the soft SIM card is not installed in the terminal in which the soft SIM card is located, it is still not possible to obtain the terminal key information which is consistent with the network key information, thus the soft SIM card cannot join the network, and the application of the soft SIM card cannot be realized. It can be seen that applying the technical solution of this embodiment is beneficial for greatly improving the application security of the soft SIM card.

Embodiment 3

Figure 3:
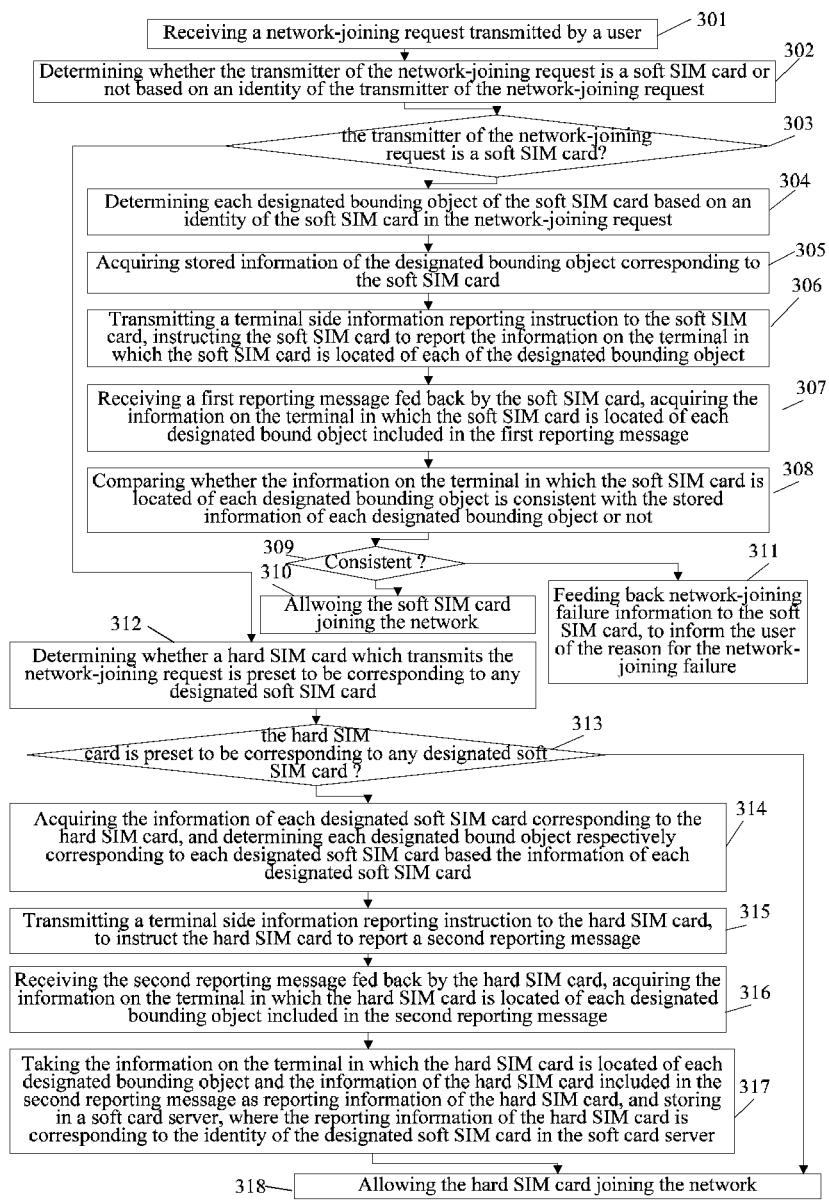
FIG. 3 is a schematic flowchart of a method for a soft SIM card to join a network according to embodiment 3 of the present invention.

Referring to FIG. 3, this embodiment provides a method for a soft SIM card to join a network, which mainly includes the following process:

Step 301: Receiving a network-joining request transmitted by a user.

Please refer to the description of step 201 in Embodiment 2 for details, but not limited to that.

Step 302: Determining whether the transmitter of the network-joining request is a soft SIM card or not based on an identity of the transmitter of the network-joining request.

Based on the identity of the transmitter of the network-joining reques, the network inquires the database of the network, and determines whether the transmitter of the network-joining request is a soft SIM card or not.

Step 303: If the transmitter of the network-joining request is a soft SIM card, then performing step 304; otherwise it may be performed as the prior art, or may go to perform step 312 according to instruction in this embodiment.

Step 304: Determining each designated bounding object of the soft SIM card based on an identity of the soft SIM card in the network-joining request.

The database at the network side stores the identity of the soft SIM card and the information of the designated bounding object which is bound with the SIM card (set based on the designation of the legal user of the soft SIM card), for example: the designated bounding object of a SIM card may be but not limited to an IMEI of a terminal or a calling number of another SIM card in the terminal, and may also be others set by the user.

Step 305: Acquiring stored information of the designated bounding object corresponding to the soft SIM card.

After determining that the network-joining request is the network-joining request of a soft SIM card, the network further acquires the stored information of the designated bounding object corresponding to the soft SIM card in the database of the present network based on the identity of the soft SIM card in the network-joining request.

The stored information of the designated bounding object corresponding to the soft SIM card is preset specifically based on the setting of the user, for example, it may be a calling number or an IMSI of another SIM card which is bound to the soft SIM card by the legal user of the soft SIM card, or an IMEI of a terminal which is bound to the soft SIM card by the legal user of the soft SIM card.

The stored information of the designated bounding object corresponding to the soft SIM card may be but not limited to be pre-stored in database of the network by the operator through arithmetic processing, and may also be but not limited to be added smartly by the network during the operation process of the network.

In this embodiment, in order to further improve the convenience for expanding the network, a soft SIM card server (it may but not limited to be obtained by modifying an existing network access device) may be set in an existing home network of the soft SIM card. The soft SIM card related information in this embodiment, including information such as the IMSI and calling number information of the soft SIM card information, and stored information of a designated bounding object corresponding to the soft SIM card and so on, is sotred in the soft SIM card server.

Further it may but not limited to enable the soft SIM card server to deal with the process related to the authentication processing of the soft SIM card.

Step 306: Transmitting a terminal side information reporting instruction to the soft SIM card, instructing the soft SIM card to report the information on the terminal in which the soft SIM card is located of each of the designated bounding object.

The network further transmits a terminal side information reporting instruction to the soft SIM card, instructs the soft SIM card to report the information on the terminal in which the soft SIM card is located of each of the designate bounding object, so that the soft SIM card reports a first reporting message based on the instruction after receiving the terminal side information reporting instruction, where the first reporting message includes the information on the terminal in which the soft SIM card is located of each of the designated bounding object in the first reporting message.

For example: after the network acquires the stored information of the designated bounding object corresponding to the soft SIM card based on the identity of the soft SIM card in the network-joining request, when determining that the bounding object of the soft SIM card is the identity of the terminal, the network transmits a terminal side information reporting instruction to the soft SIM card, to instruct the soft SIM card to report the identity of the terminal in which the soft SIM card is located.

For another example: after the network acquires the stored information of the designated bounding object corresponding to the soft SIM card based on the identity of the soft SIM card in the network-joining request, when determining that the bounding object of the soft SIM card is the calling number of the second SIM card, the network transmits the terminal side information reporting instruction to the soft SIM card, to instruct the soft SIM card to report the calling number of the second SIM card in the terminal in which the soft SIM card is located.

For another example: after the network acquires the stored information of the designated bounding object corresponding to the soft SIM card based on the identity of the soft SIM card in the network-joining request, when determining that the bounding object of the soft SIM card is the calling number of the second SIM card and the identity of the terminal in which the soft SIM card is located, the network transmits the terminal side information reporting instruction to the soft SIM card, to instruct the soft SIM card to report the calling number of the second SIM card in the terminal in which the soft SIM card is located and the identity of the terminal.

Here the information of the identity of the terminal may refer to the relative description in Embodiments 1-2, but not limit to that.

Here, in this embodiment, the second SIM card in the terminal may be but not limited to the hard SIM card or the soft SIM card.

Step 307: Receiving a first reporting message fed back by the soft SIM card, acquiring the information on the terminal in which the soft SIM card is located of each designated bounding object included in the first reporting message.

After receiving the first reporting message of the soft SIM card, the network acquires the information of the terminal included in the message: the information on the terminal in which the soft SIM card is located of each designated bounding object.

Step 308: Comparing whether the information on the terminal in which the soft SIM card is located of each designated bounding object is consistent with the stored information of each designated bounding object or not.

In this embodiment, the information on the terminal in which the soft SIM card is located of each designated bounding object of the current the soft SIM card may be acquired by the network by instructing the user to report through steps 306 and 307 of this embodiment, but it will not be limited herein. In this embodiment, various information of the terminal in which the soft SIM card is located may be included in a network-joining request when the soft SIM card transmits the network-joining request, so that the network reads the information on the terminal in which the soft SIM card is located of each designated bounding object from the network-joining request based on the bounding object of the soft SIM card determined by the network when receiving the network-joining request, but it will not be limited herein.

The network compares the information on the terminal in which the soft SIM card is located of each designated bounding object with the stored information of each designated bounding object corresponding to the soft SIM card sotred in the database of the present network, determines whether they are completely consistent, if not consistent, then determines that the present user is an illegal user of the soft SIM card, and rejects the network-joining request of the soft SIM card; if completely consistent, then determines that the present user is a legal user of the soft SIM card, and allows the network-joining request of the soft SIM card.

For example, the current designated bounding object is: the identity of the terminal, the step specifically is: comparing whether an identity of a bound terminal which is pre-stored for the soft SIM card is consistent with the identity of the terminal in which the soft SIM card is located. Suppose that the pre-stored identity of the bound terminal is: 11***0, while the identity of the terminal in which the current soft SIM card is located is: 11*0, it may be determined that they are consistent, then performing step 310; otherwise, going to perform step 311**.

For example, the current designated bounding object is: the identity of the terminal and the identity of the hard SIM card, the step specifically is: comparing whether an identity of a bound hard SIM card pre-stored for the soft SIM card is consistent with the identity of the hard SIM card which is in the same terminal with the current soft SIM card; and also comparing whether the identity of the terminal in which both the current soft SIM card and the hard SIM card are located is consistent with an identity of binding bound terminal which is pre-stored for the soft SIM card, if both of them are consistent, then performing step 310; otherwise, if one of them is not consistent, going to perform step 311.

For example, the current designated bounding object is: the identity of the hard SIM card, the step specifically is: comparing whether an identity of a bound hard SIM card which is pre-stored for the soft SIM card is consistent with the identity of the hard SIM card which is in the same terminal with the current soft SIM card, if consistent, then performing step 310; otherwise, going to perform step 311. Step 309: If consistent, then performing step 310; otherwise, ending the process, or step 311 may be further performed.

Step 310: Allowing the soft SIM card joining the network.

The network-joining request of the soft SIM card is passed in the network-joining authentication in this phase, and the subsequent network-joining connecting process is entered, so as to establish a network connection for the soft SIM card, to provide network communication services for the user.

Step 311: Feeding back network-joining failure information to the soft SIM card, to inform the user of the reason for the network-joining failure.

If the present user is an illegal user of the soft SIM card, besides refusing the network-joining request of the soft SIM card, it may further perform this step: feeding back a network-joining failure notice to the soft SIM card, so that the user knows the process result of the network-joining application, thereby improving the user experience.

If the transmitter of the current network-joining request is not a soft SIM card, then it may be processed directly as the prior art, but in order to further improve the application security of the soft SIM card, it may further but not limited to perform step 311 and subsequent processes.

It can be seen from the above that, when applying the technical solution of this embodiment to deal with a network-joining request of a soft SIM card, whether the stored information of each designated bounding object corresponding to the soft SIM card at the network side is consistent with the information on the terminal in which the soft SIM card is located of each of these designated bounding objects are also compared, if not consistent, then determine that the present user is an illegal user of the soft SIM card, and forbid the network-joining of the soft SIM card; only in the case of completely consistent, determine that the user is a legal user of the soft SIM card, and allow the network-joining of the soft SIM card. It can be seen that, even in the case that the user acquires the information of the soft SIM card, the user still can not make the soft SIM card join the network if the information of the terminal is not corresponding to the information of the bounding object designated by the legal user of the soft SIM card, thus the application of the soft SIM card cannot be realized, and effective communication application cannot be performed.

For example: a legal user of a soft SIM card designates that abounding object of the soft SIM card is another hard SIM card possessed by the user, the bounding object is a calling number of the hard SIM card, where the content of the calling number is: 137****45, then stored information of the designated bounding object corresponding to the soft SIM card is: 137**45. Under this circumstance, even though the network determines that the information of the soft SIM card (includes but not limited to an identity and/or authentication and encryption information of the soft SIM card) is correct, since the present user terminal does not have the hard SIM card of which the content of the calling number is: 137****45, the user still can not make the soft SIM card join the network and can not use this soft SIM card.

It can be seen that, comparing to the technical solution in the prior art that as long as a user acquires the information of the soft SIM, the user can realize the network communication, applying the technical solution of this embodiment greatly improves the application security of the soft SIM card.

Step 312: Determining whether a hard SIM card which transmits the network-joining request is preset to be corresponding to any designated soft SIM card.

The network judges, based on an identity of the hard SIM card in the network-joining request, whether the hard SIM card is preset to be corresponding to certain one or multiple designated soft SIM cards, if yes, then performs step 312; otherwise, directly performs a hard SIM card network-joining process according to the prior art, to make it join the network.

Step 313: If yes, then performing step 314; otherwise, going to perform step 318.

Step 314: Acquiring the information of each designated soft SIM card corresponding to the hard SIM card, and determining each designated bounding object respectively corresponding to each designated soft SIM card based the information of each designated soft SIM card.

If the user also designates the operator to pre-store a correspondence between the hard SIM card and the set soft SIM card at the network side based on user's setting when the user of the soft SIM setting the soft card, the information of each designated soft SIM card (includes but not limited to the calling number and/or IMSI or other information of the soft SIM card) corresponding to the hard SIM card is also acquired based on the set correspondence, and each designated bounding object respectively corresponding to each designated soft SIM card corresponding to the current hard SIM card is determined based on the information of each designated soft SIM card.

For example, the current hard SIM card is corresponding to a soft SIM card whose calling number is 137******50, the soft SIM card is set to be corresponding to a bounding object which is: the IMEI of the terminal.

Step 315: Transmitting a terminal side information reporting instruction to the hard SIM card, to instruct the hard SIM card to report a second reporting message.

For example, the current hard SIM card is corresponding to a soft SIM card whose calling number is 137******50, the soft SIM card is set to be corresponding to a bounding object which is: the IMEI of the terminal. Then the network transmits a terminal side information reporting instruction to the hard SIM card, to instruct the hard SIM card to report a second reporting message, after the hard SIM card receives the terminal side information reporting instruction, the hard SIM card reads the IMEI of the terminal based on the instruction, and transmits the read IMEI of the terminal to the network while the IMEI is included in a second reporting message, so that the network performs authentication based on the report.

Step 316: Receiving the second reporting message fed back by the hard SIM card, acquiring the information on the terminal in which the hard SIM card is located of each designated bounding object included in the second reporting message.

Step 317: Taking the information on the terminal in which the hard SIM card is located of each designated bounding object and the information of the hard SIM card included in the second reporting message as reporting information of the hard SIM card, and storing in a soft card server, where the reporting information of the hard SIM card is corresponding to the identity of the designated soft SIM card in the soft card server.

For example, the information reported in the second reporting message is the IMEI of the terminal, then the IMEI of the terminal is stored in the soft card server as the stored information of the designated bounding object of the corresponding soft SIM card, and is marked as the reporting information of the hard SIM card.

In this embodiment, the information on the terminal in which the hard SIM card is located of each designated bounding object respectively corresponding to the soft SIM card corresponding to the current hard SIM card may be acquired by the network through instructing the user to report as in steps 315-316 of this embodiment, but it will not be limited herein. In this embodiment, various information of the terminal in which the hard SIM card is located may also be included in the network-joining request when the hard SIM card transmits the network-joining request, so that the network reads the information on the terminal in which the hard SIM card is located of each designated bounding object from the network-joining request based on the type of the designated bounding object corresponding to the soft SIM card after receiving the network joining request, but it will not be limited herein.

Step 318: Allowing the hard SIM card joining the network.

It can be seen from the above that, when the transmitter of the network-joining request is a hard SIM, if the hard SIM card had been preset as being corresponding to a certain soft SIM card, the process of steps 312-317 are further performed, so that the information of the designated bounding object of the soft SIM card corresponding to the hard SIM card is stored to the soft card server, added to stored information of the designated bounding object, and stored as reporting information of the hard SIM card. This complementary technical solution ensures the application security of the soft SIM card, and is further beneficial for realizing the dynamic update of the information of each designated bounding object corresponding to each oft SIM card in the soft card server, thereby further meeting personalized needs of users and satisfying diverse applications of the user.

In addition, in order to further improve the application security of the soft SIM card, the following technical solution may be further included, but it will not be limited herein:

After receiving a network-quiting request of any soft SIM card, delete soft SIM card reporting information reported during the network-joining of the soft SIM card at the network side (for example, in the soft card server), so as to ensure that the above authentication comparing the information on the terminal of the bounding object with the stored information of the bounding object must be performed again when the soft SIM card joins the network again, thereby further ensuring the application security of the soft SIM card.

In addition, the following technical solution may further be adopted, after receiving a network-quiting request of any hard SIM card which is set to be corresponding to any soft SIM card, delete hard SIM card reporting information reported during the network-joining of the hard SIM card at the network side (for example, in the soft card server), so as to ensure that the above authentication comparing the information on the terminal of the bounding object with the stored information of the bounding object must be performed again when the soft SIM card corresponding to the hard SIM card joins the network again, thereby further ensuring the application security of the soft SIM card.

Embodiment 4

The main difference between this embodiment and Embodiments 1-3 is that: this embodiment integrates the technical solutions of embodiments 1, 2, 3, performs legality authentication for a soft SIM card in multiple stages of soft card activating and network-joining, respectively, which is further beneficial for ensuring the application legitimacy of the soft SIM card.

Figure 4:
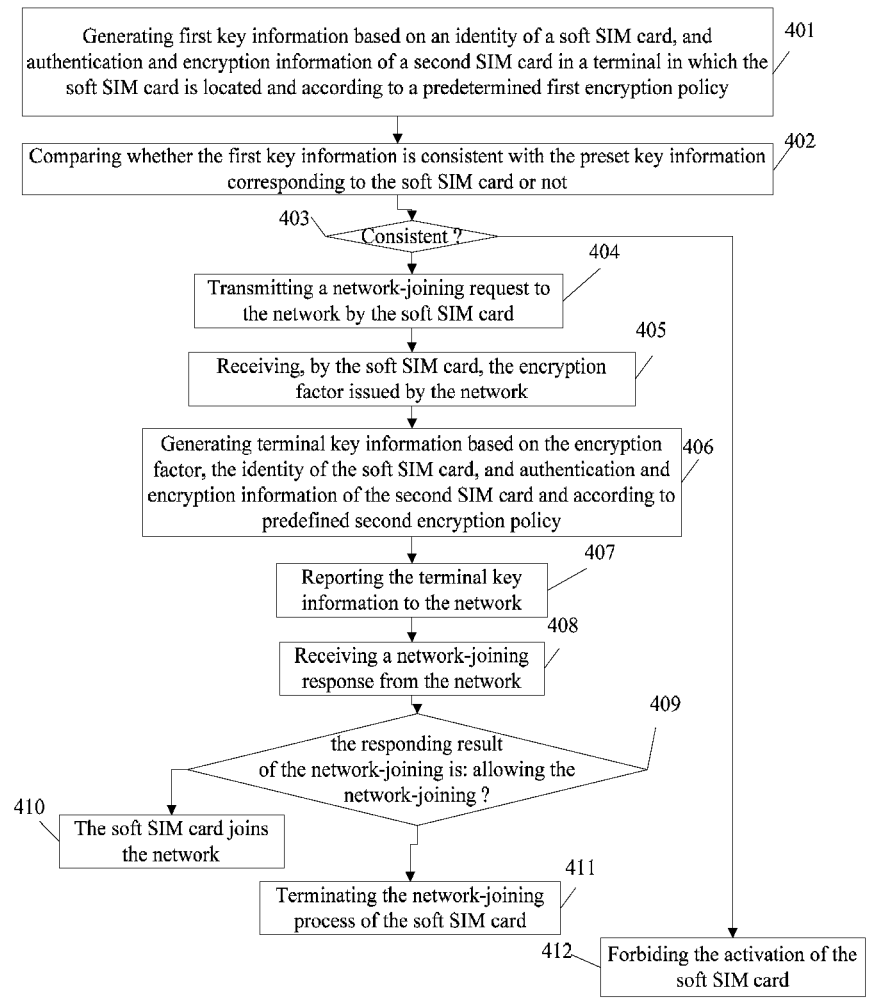
FIG. 4 is a schematic flowchart of a method for a soft SIM card to join a network according to embodiment 4 of the present invention.

Referring to FIG. 4, this embodiment provides a method for a soft SIM card to join a network, which mainly includes the following process:

Step 401: Generating first key information based on an identity of a soft SIM card, and authentication and encryption information of a second SIM card in a terminal in which the soft SIM card is located and according to a predetermined first encryption policy.

A terminal reads soft SIM card file, and generates first key information based on an identity of a soft SIM card, and authentication and encryption information of a second SIM card in a terminal in which the soft SIM card is located and according to a predetermined first encryption policy.

The second SIM card is another SIM card which is in the same terminal with the soft SIM card, it may be but not limited to a hard SIM card, and may also be but not limited to another soft SIM card.

In this embodiment, when a user performs account opening and binding of a soft SIM card, the user may designate a calling number or an IMSI of another SIM card possessed by the user, when the operator generates soft SIM card file for the soft SIM card based on the information provided by the user, the operator does not generates authentication and encryption information of the soft SIM card, but inquires a home network of the calling number or the IMSI of another SIM card possessed by the user based on the information provided by the user, to acquire authentication and encryption information (in any network, authentication and encryption information of any SIM card in its home network is unique) of the corresponding SIM card designated by the user, and takes it as the authentication and encryption information corresponding to this soft SIM card.

After the operator generates the soft SIM card information without the authentication and encryption information of the soft SIM card, further generates preset key information corresponding to this soft SIM card based on the generated information of the soft SIM card (the regular necessary information is the identity of the soft SIM card, but may also include other information), and the acquired authentication and encryption information of the SIM card designated by the user and according to the predetermined encryption algorithm.

When providing the soft SIM card to the user of the soft SIM card, both the generated soft SIM card information and the preset key information corresponding to the soft SIM card are provided to the user.

Step 402: Comparing whether the first key information is consistent with the preset key information corresponding to the soft SIM card or not.

The terminal compares the first key information currently generated in step 401 with the preset key information corresponding to the soft SIM card pre-stored in the SIM card file, determines whether they are consistent or not, if not consistent, then determines that the user is an illegal user of the soft SIM card, and goes to perform step 412: forbidding the activation of the soft SIM card, or else, allows the soft SIM card to perform the subsequent process.

Step 403: If consistent, performing step 404; otherwise performing step 412.

Step 404: Transmitting a network-joining request to the network by the soft SIM card.

Please refer to steps 201, 202 and so on in Embodiments 2 and 3 for details.

After the soft SIM card transmits the network-joining request to the network, the network will generate an encryption factor and issue to the soft SIM card based on an authentication process predefined in the network.

Please refer to the description of step 203 in embodiment 2 for details, but not limited to that.

Step 405: Receiving, by the soft SIM card, the encryption factor issued by the network.

Please refer to the description of step 204 in Embodiment 2 for details, but not limited to that.

Step 406: Generating terminal key information based on the encryption factor, the identity of the soft SIM card, and authentication and encryption information of the second SIM card and according to predefined second encryption policy.

The terminal reads the SIM card file, and generates the terminal key information based on the encryption factor issued by the network, the identity of the soft SIM card, and the authentication and encryption information of the second SIM card (which may be but not limited to a hard SIM card) of the terminal in which the soft SIM card is located and according to predefined encryption policy set in it.

Step 407: Reporting the terminal key information to the network.

The terminal reports the key information currently generated in step 406 to the network, so that the network compares whether the terminal key information is consistent with the network key information generated at the network side, so as to determine whether or not to allow the terminal joining the network.

The network key information is: generated based on the encryption factor, the identity of the soft SIM card and the authentication and encryption information corresponding to the soft SIM card pre-stored at the network side and according to predefined encryption policy.

At the network side, the network generates the network key information based on the currently generated encryption factor, the identity of the soft SIM card, and the authentication and encryption information corresponding to the soft SIM card and according to the predetermined encryption algorithm corresponding to the soft SIM card pre-stored in the network. Please refer to the description of step 204 in Embodiment 2 for details of generating the network key information by the network side.

At the network side, if the terminal key information reported by the terminal is consistent with the network key information generated through network calculation, then it can be determined that the present user is a legal user of the soft SIM card, then allows the soft SIM card joining the network, otherwise, determines that the present user is an illegal user of the soft SIM card and rejects the network-joining of the soft SIM card.

Step 408: Receiving a network joining response from the network.

After the network determines whether the user is a legal user of the soft SIM or not based on the terminal key information reported by the terminal and the network key information generated through network calculation, returns the network-joining response to the soft SIM card, to inform the process result of the network-joining request of the soft SIM card.

Step 409: If the responding result of the network-joining is: allowing the network-joining, then performing step 410; otherwise performing step 411.

Step 410: Joining the network by the soft SIM card.

Step 411: Terminating the network-joining process of the soft SIM card.

Step 412: Forbidding the activation of the soft SIM card.

It can be seen from the above that, by applying the technical solution of this embodiment, at the terminal side, in the process of activating the soft SIM card and the network-joining of the soft SIM card, the terminal performs legality authentication of the soft SIM card based on the information of the soft SIM card and the information on the terminal of the designated bounding object of the soft SIM card, respectively, and terminates the application of the soft SIM card if the user is determined as an illegal user of the soft SIM card at any stage. Compared with Embodiments 1-3, this embodiment is beneficial for further improving the application security of the soft SIM card.

Embodiment 5

Figure 5:
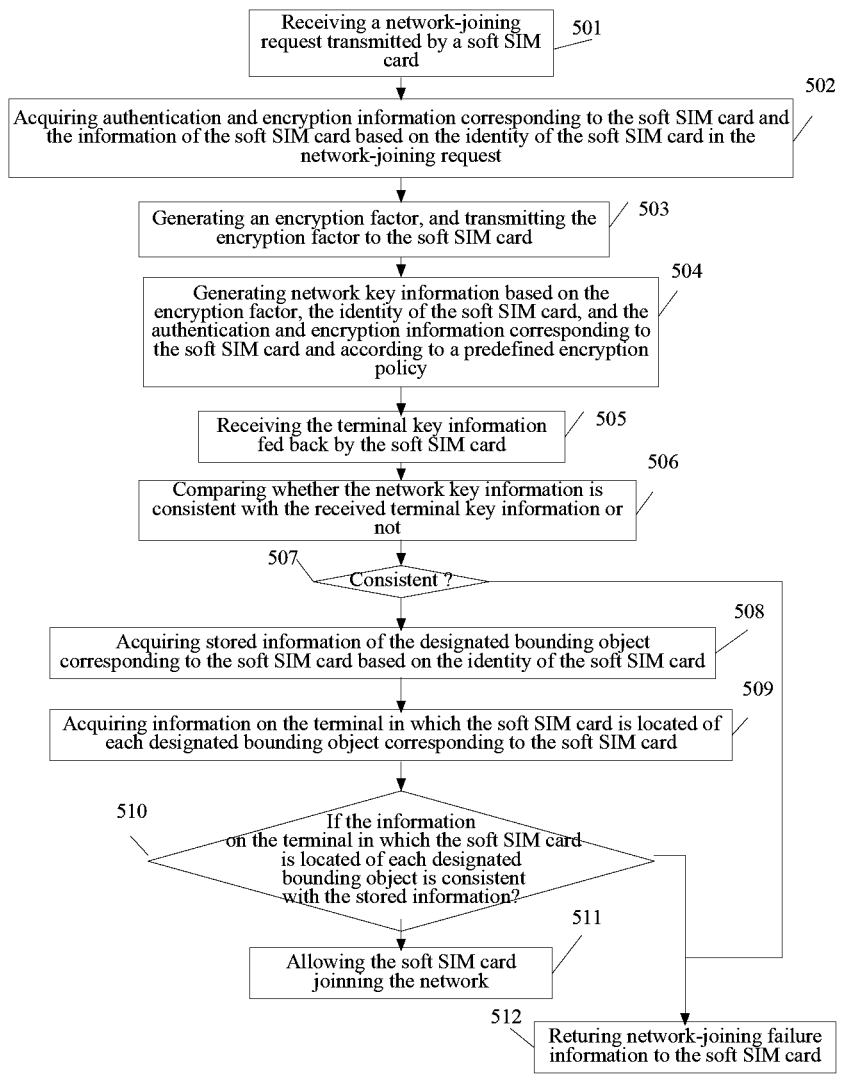
FIG. 5 is a schematic flowchart of a method for a soft SIM card to join a network according to embodiment 5 of the present invention.

Referring to FIG. 5, this embodiment provides a method for a soft SIM card to join a network, which includes the following process:

Step 501: Receiving a network-joining request transmitted by a soft SIM card.

The network receives the network-joining request of the soft SIM card, please refer to the relative descriptions of steps 201 and 301 in Embodiments 2 and 3 for details, but not limited to that.

Step 502: Acquiring authentication and encryption information corresponding to the soft SIM card and the information of the soft SIM card based on the identity of the soft SIM card in the network-joining request.

After receiving the network-joining request, the network acquires the identity of the soft SIM card, and acquires the authentication and encryption information corresponding to the soft SIM card and the information of the soft SIM card.

Please refer to the relative descriptions of step 202 in Embodiments 2 and 3 for details, but not limited to that.

Step 503: Generating an encryption factor, and transmitting the encryption factor to the soft SIM card.

The network generates an encryption factor, and transmits the encryption factor to the soft SIM card, so that the terminal at the soft SIM card side performs encryption calculation at the terminal side based on the encryption factor and according to a predefined encryption policy.

Please refer to the relative descriptions of step 203 in Embodiments 2 and 3 for details, but not limited to that.

Step 504: Generating network key information based on the encryption factor, the identity of the soft SIM card, and the authentication and encryption information corresponding to the soft SIM card and according to a predefined encryption policy.

The network generates the network key information based on the currently generated encryption factor, the identity of the soft SIM card, and the authentication and encryption information corresponding to the soft SIM card acquired in step 202 and according to the predetermined encryption algorithm corresponding to the soft SIM card pre-stored in the network.

Please refer to the relative descriptions of step 204 in Embodiments 2 and 3 for details, but not limited to that.

Step 505: Receiving the terminal key information fed back by the soft SIM card.

In this embodiment, the terminal key information is generated not only according to the predetermined encryption algorithm corresponding to the soft SIM card of the terminal, but also by combining with the soft SIM card information of the terminal, combining with the encryption factor issued by the network, and combining with the authentication and encryption information of the second SIM card of the terminal, therefore, only under the circumstance that all the information is the same with which is predetermined at the network, it is possible to make the terminal key file consistent with the network key information, as long as any of them is different from the preset information at the network side, then the obtained terminal key file will be inconsistent with the network key information generated at the network side based on the information designated by a legal user of the soft SIM card, under this circumstance, it may be determined that the user is an illegal user of the soft SIM card.

Step 506: Comparing whether the network key information is consistent with the received terminal key information or not.

Step 507: If consistent, then performing step 508; otherwise, performing step 512.

Compare whether the network key information is consistent with the received terminal key information or not, it the terminal key information reported by the terminal is consistent with the network key information generated by the network through calculation, then it may be determined that the present user is a legal user of the soft SIM card, then perform step 508; otherwise, determine that the present user is an illegal user of the soft SIM card, then the authentication encryption processing of the network-joining may be terminated, or step 509 may be performed in further.

Step 508: Acquiring stored information of the designated bounding object corresponding to the soft SIM card based on the identity of the soft SIM card.

After determining that the network-joining request is a network-joining request of the soft SIM card, the network further acquires the stored information of the designated bounding object corresponding to the soft SIM card in the database of the network based on the identity of the soft SIM card in the network-joining request.

Please refer to the relative descriptions of step 305 in Embodiment 3 for details, but not limited to that.

Step 509: Acquiring information on the terminal in which the soft SIM card is located of each designated bounding object corresponding to the soft SIM card.

The network acquires the information on the terminal in which the soft SIM card is located of each designated bounding object.

Please refer to the relative descriptions of steps 306 and 307 in Embodiment 3 for details, but not limited to that.

Step 510: If the information on the terminal in which the soft SIM card is located of each designated bounding object is consistent with the stored information of each designated bounding object, then performing step 511; otherwise terminating, or step 512 may be further performed.

Please refer to the relative descriptions of steps 308 and 309 in Embodiment 3 for details, but not limited to that.

Step 511: Allowing the soft SIM card joining the network.

Please refer to the relative descriptions of step 310 in Embodiment 3 for details, but not limited to that.

Step 512: Returning network-joining failure information to the soft SIM card.

Please refer to the relative descriptions of step 311 in Embodiment 3 for details, but not limited to that.

It can be seen from the above that, the main difference between this embodiment and Embodiments 2 and 3 is that both of the two authentication processes in Embodiments 2 and 3 are included in this embodiment when the network processes the network-joining request from the soft SIM card in this embodiment, compared with the technical solutions of Embodiments 2 and 3, applying the technical solution of this embodiment is beneficial for further improving the application security of the soft SIM card.

Further authentication principle analysis and authentication effectiveness analysis may refer to the relative descriptions of Embodiments 2 and 3.

Embodiment 6

Figure 6:
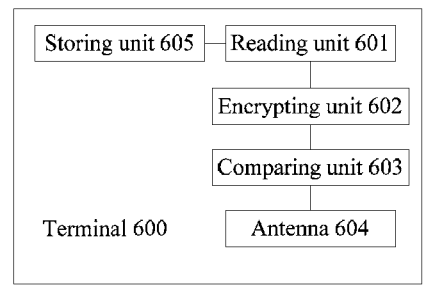
FIG. 6 is a schematic structural diagram of a terminal 600 according to embodiment 6 of the present invention.

Referring to FIG. 6, this embodiment provides a terminal 600, which mainly includes: a reading unit 601, an encrypting unit 602, a comparing unit 603, and an antenna 604. Connection relations among each component and operational principles are as follows.

The reading unit 601 is configured to read information of a soft SIM card in the terminal, and acquire information on the terminal of a bounding object corresponding to the soft SIM card based on the information of the soft SIM card. The specific principles may be referred to the relative descriptions of step 101 in Embodiment 1, but they should not be limited herein.

The encrypting unit 602 is electrically connected to the reading unit 601, and is configured to generate first key information based on the information of the soft SIM card and the information on the terminal of the bounding object acquired through reading by the reading unit 601 and according to a predefined encryption policy. The specific principles may be referred to the relative descriptions of step 102 in Embodiment 1, but they should not be limited herein.

The comparing unit 603 is electrically connected to the encrypting unit 602, and is configured to compare whether the first key information generated by the encrypting unit 602 is consistent with preset key information corresponding to the soft SIM card or not. The preset key information corresponding to the soft SIM card is: key information generated based on the information of the soft SIM card and the preset information of each bounding object by the operator of the soft SIM card and according to the predefined encryption policy, and provided to the user. The specific principles may be referred to the relative descriptions of steps 103, 104 and 105 in Embodiment 1, but they should not be limited herein.

The antenna 604 is electrically connected to the comparing unit 603, and is configured to transmit information to a network and receive information from the network. Here, the information transmitted to the network includes: when a comparing result determined by the comparing unit 603 is that the first key information is consistent with the preset key information corresponding to the soft SIM card, the antenna 604 transmits a network network-joining request to the network, so as to activate the soft SIM card, and enter a network-joining request process to establish a connection with the network.

It can be seen from the above that, applying the technical solution of this embodiment, in this embodiment, after installing the soft SIM card in the terminal, when activating the soft SIM card, the terminal determines the bounding object of the soft SIM card based on the information of the soft SIM card in the terminal, reads information on the terminal of each of the bounding object, performs encryption arithmetic in the terminal to obtain the first key information based on a predetermined encryption policy combined with the information of the soft SIM card and information on the terminal of each of the bounding object, compares the first key information obtained through the encryption described in this paragraph with the key information previously provided to the user by the operator of the soft SIM card, if the two are consistent, then determines that the present user is a legal user of the soft SIM card, allows the activation of the soft SIM card, so as to enable the user to perform network communication applying the soft SIM card.

Since during the generation of the first key information through the local encryption, besides using the predetermined encryption algorithm and the information of the soft SIM card, the information on the terminal of the bounding object of the soft SIM card (that is the terminal information) is also combined with, thus, as long as any one of the three: the encryption algorithm, the information of the soft SIM card and the terminal information, is not consistent with which was preset at the operator side when the user get the soft SIM card, then the first key information generated through the encryption will be not consistent with the key information generated by the operator based on the information of the soft SIM card and the preset information of each of the bounding object and according to the predetermined encryption policy, that is, the terminal will determine that the present user is an illegal user of the soft SIM card, forbids the activation of the soft SIM card, thereby avoiding the soft SIM card being used illegally.

It can be seen from the above that, relative to the prior art, applying the technical solution of this embodiment is beneficial for greatly improving the application security of the soft SIM card, and is beneficial for the popularization and application of the soft SIM card, thereby making full use of the advantages of being easy to use of the soft SIM card.

In addition, the terminal of this embodiment may further include a storing unit 605, the storing unit 605 may be a memory chip fixed in the terminal, and may also be but not limited to a removable memory chip or a removable memory and so on. The storing unit 605 stores information, the stored information includes: the information of the soft SIM card, and the information of the soft SIM card at least includes: an identity of the soft SIM card and the preset key information corresponding to the soft SIM card. In this way, when providing the soft SIM card to the user, the operator may directly provide the storing unit 605 to the user, information related to the soft SIM card is encapsulated in the storing unit 605, the reading unit 601 directly reads the storing unit 605 to acquire the information of the SIM card, which is further convenient for the user to use it.

Embodiment 7

Figure 7:
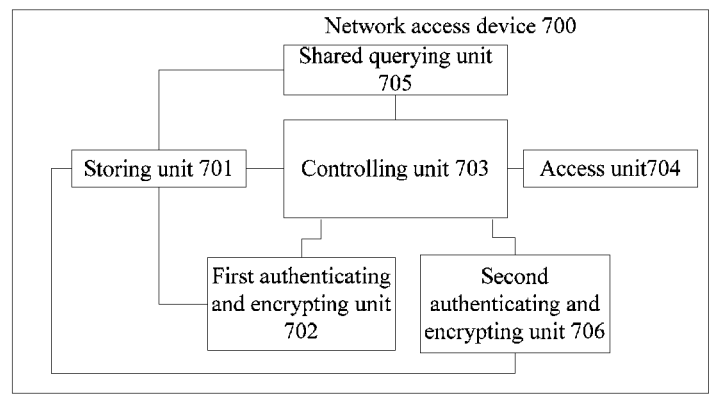
FIG. 7 is a schematic structural diagram of a network access device 700 according to embodiment 7 of the present invention.

Referring to FIG. 7, this embodiment provides a network access device 700, which mainly includes: a storing unit 701, a first authenticating and encrypting unit 702, a controlling unit 703 and an access unit 704. Connection relations among each components and operational principles are as follows:

The storing unit 701 is configured to store pre-stored information of a soft SIM card, the information of the soft SIM card at least includes an identity of the soft SIM card, and authentication and encryption information corresponding to the soft SIM card. The authentication and encryption information corresponding to the soft SIM card may be but not limited to authentication and encryption information of the soft SIM card generated when generating soft SIM card information, and may also be but not limited to authentication and encryption information of another SIM card designated by the user which is acquired based on designation of the user.

The first authenticating and encrypting unit 702 is configured to, under control of the controlling unit 703, generate and transmit an encryption factor to the user, and generate network key information based on the encryption factor, and the identity of the soft SIM card and the authentication and encryption information corresponding to the soft SIM card stored in the storing unit 701 according to a predefined encryption policy corresponding to the SIM card stored in the storing unit 701, and compare whether the network key information is consistent with terminal key information fed back by the soft SIM card or not, if consistent, then feed back an authentication result to the controlling unit 703: authentication passed. Here, the terminal key information is generated by a terminal in which the soft SIM card is located based on the encryption factor, the identity of the soft SIM card and authentication and encryption information of a second SIM card (may be but not limited to a hard SIM card in this terminal) in the terminal and according to a predefined encryption policy. The principles may be referred to the relative descriptions of steps 202-208 in Embodiment 2, but they should not be limited herein.

The controlling unit 703 is configured to control the first authenticating and encrypting unit 702, and control an operation of the access unit 704 based on feedback of the first authenticating and encrypting unit 702.

The access unit 704 is electrically connected to the controlling unit 703, and is configured to provide network access to the SIM card under control of the controlling unit 703.

The operational principles of the network access unit 704 in this embodiment may be referred to the relative descriptions of Embodiment 2, but they should not be limited herein.

It can be seen from the above that, by applying the technical solution of this embodiment, since the technical solution of this embodiment is applied, when the network deals with a network-joining request of the soft SIM card, network key information is generated at the network side based on an encryption factor, an identity of a soft SIM card, and authentication and encryption information corresponding to the soft SIM card and according to a predetermined encryption policy, when performs authenticating, compares the network key information with terminal key information generated by a terminal based on the encryption factor issued by the network, an identity of the soft SIM card acquired by the terminal, and the authentication and encryption information of the second SIM card in the terminal and according to a predetermined encryption policy, if it is not consistent, then determines that the user is an illegal user of the soft SIM card.

It can be seen from the above that, by applying the technical solution of this embodiment, even though the information of the soft SIM card is acquired by the user, but if the bound SIM card designated by the legal user of the soft SIM card is not installed in the terminal in which the soft SIM card is located, it is still not possible to obtain the terminal key information which is consistent with the network key information, thus the soft SIM card cannot join the network, and the application of the soft SIM card cannot be realized. It can be seen that applying the technical solution of this embodiment is beneficial for greatly improving the application security of the soft SIM card.

In addition, the storing unit 701 may further store information of the bound SIM card which is preset for the soft SIM card by the user of the SIM card, and authentication and encryption information of the bound SIM card, the authentication and encryption information of the bound SIM card is stored as authentication and encryption information corresponding to the soft SIM card, so that the network access device generates network key information based on the authentication and encryption information of the bound SIM card when handling a network-joining request of the soft SIM card, so as to compare with the terminal key information which is generated by the terminal based on the authentication key information of the second SIM card in the terminal, and determine whether the user is a legal user of the soft SIM card or not. Please refer to the relative descriptions in Embodiments 2-8 for further details.

In addition, the network access device may further includes a shared querying unit 705, the shared querying unit 705 is electrically connected to the storing unit 701, and is configured to query to get authentication and encryption information of the bound SIM card from a home network of the bound SIM card based on the information of the bound SIM card, and store the authentication and encryption information of the bound SIM card to the storing unit 701. Please refer to the relative descriptions in Embodiments 2-6 for further details.

In addition, the network access device in this embodiment may further include but not limited to: a second authenticating and encrypting unit 706.

The second authenticating and encrypting unit 706 is electrically connected to the controlling unit 703, and is configured to perform further authentication processing under control of the controlling unit 703, where the authentication processing includes: after the authentication of the first authenticating and encrypting unit 702 is passed, the second authenticating and encrypting unit 706 is configured to further compare whether information on a terminal in which the soft SIM card is located of each of the designated bounding object information corresponding to the soft SIM card is consistent with the stored information of the designated bounding object corresponding to the soft SIM card stored in the storing unit 701 or not, if consistent, then feed back an authentication result to the controlling unit 703: authentication passed. Accordingly, the controlling unit 703 is configured to control the access unit 704 to provide network access for the SIM card after receiving the authentication results, which are both authentication passed, of the first comparing unit and the second authenticating and encrypting unit 706. Further operational principles and beneficial effects may be referred to the relative descriptions in Embodiment 4, but they should not be limited herein.

It can be seen from the above that, since the network access device further includes the second authenticating and encrypting unit 706, a second authentication control for the network-joining of the soft SIM card can be realized at the network side, thereby further improving the application security of the soft SIM card, and avoiding the soft SIM card to be peculated illegally.

Embodiment 8

Figure 8:
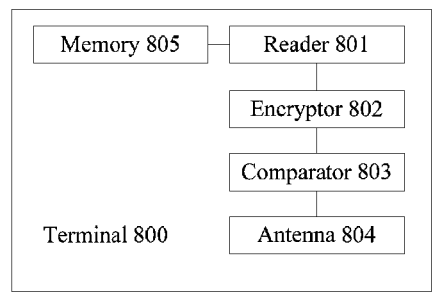
FIG. 8 is a schematic structural diagram of a terminal 800 according to embodiment 8 of the present invention.

Referring to FIG. 8, this embodiment provides a terminal 800, which mainly includes: a reader 801, an encryptor 802, a comparator 803 and an antenna 804. Connection relations among each component and operational principles are as follows.

The reader 801 is configured to read information of a soft SIM card in the terminal, and acquire information on the terminal of a bounding object corresponding to the soft SIM card based on the information of the soft SIM card. The specific principles may be referred to the relative descriptions of step 101 in Embodiment 1, but they should not be limited herein.

The encryptor 802 is electrically connected to the reader 801, and is configured to generate first key information based on the information of the soft SIM card and the information on the terminal of the bounding object acquired through reading by the reader 801 and according to a predefined encryption policy. The specific principles may be referred to the relative descriptions of step 102 in Embodiment 1, but they should not be limited herein.

The comparator 803 is electrically connected to the encryptor 802, and is configured to compare whether the first key information generated by the encryptor 802 is consistent with preset key information corresponding to the soft SIM card or not. The preset key information corresponding to the soft SIM card is: key information which is generated, based on the information of the soft SIM card and the preset information of each bounding object by the operator of the soft SIM card and according to the predefined encryption policy, and provided to the user. The specific principles may be referred to the relative descriptions of steps 103, 104 and 105 in Embodiment 1, but they should not be limited herein.

The antenna 804 is electrically connected to the comparator 803, and is configured to transmit information to a network and receive information from the network. Here, the information transmitted to the network includes: when a comparing result determined by the comparator 803 is that the first key information is consistent with the preset key information corresponding to the soft SIM card, the antenna 804 transmits a network network-joining request to the network, so as to activate the soft SIM card, and enter a network-joining request process to establish a connection with the network.

It can be seen from the above that, applying the technical solution of this embodiment, in this embodiment, after installing the soft SIM card in the terminal, when activating the soft SIM card, the terminal determines the bounding object of the soft SIM card based on the information of the soft SIM card in the terminal, reads information on the terminal of each of the bounding object, performs encryption arithmetic in the terminal to obtain the first key information based on a predetermined encryption policy combined with the information of the soft SIM card and information on the terminal of each of the bounding object, compares the first key information obtained through the encryption described in this paragraph with the key information previously provided to the user by the operator of the soft SIM card, if the two are consistent, then determines that the present user is a legal user of the soft SIM card, allows the activation of the soft SIM card, so as to enable the user to perform network communication applying the soft SIM card.

Since during the generation of the first key information through the local encryption, besides using the predetermined encryption algorithm and the information of the soft SIM card, the information on the terminal of the bounding object of the soft SIM card (that is the terminal information) is also combined with, thus, as long as any one of the three: the encryption algorithm, the information of the soft SIM card and the terminal information, is not consistent with which was preset at the operator side when the user get the soft SIM card, then the first key information generated through the encryption will be not consistent with the key information generated by the operator based on the information of the soft SIM card and the preset information of each of the bounding object and according to the predetermined encryption policy, that is, the terminal will determine that the present user is an illegal user of the soft SIM card, forbids the activation of the soft SIM card, thereby avoiding the soft SIM card being used illegally.

It can be seen from the above that, relative to the prior art, applying the technical solution of this embodiment is beneficial for greatly improving the application security of the soft SIM card, and is beneficial for the popularization and application of the soft SIM card, thereby making full use of the advantages of being easy to use of the soft SIM card.

In addition, the terminal of this embodiment may further include a memory 805, the memory 805 may be a memory chip fixed in the terminal, and may also be but not limited to a removable memory chip or a removable memory and so on. The memory 805 stores information, the stored information includes: the information of the soft SIM card, and the information of the soft SIM card at least includes: an identity of the soft SIM card and the preset key information corresponding to the soft SIM card. In this way, when providing the soft SIM card to the user, the operator may directly provide the memory 805 to the user, information related to the soft SIM card is encapsulated in the memory 805, the reader 801 directly reads the memory 805 to acquire the information of the SIM card, which is further convenient for the user to use it.

Embodiment 9

Figure 9:
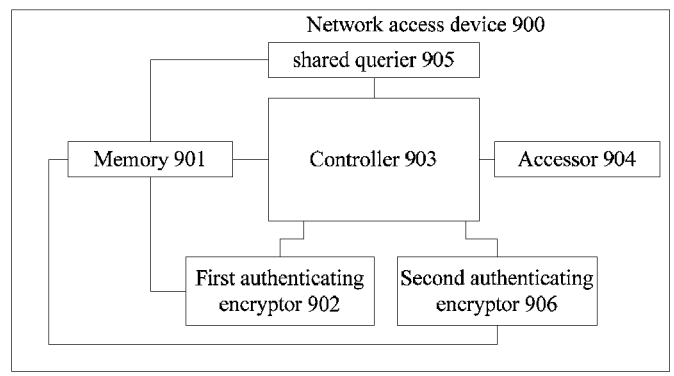
FIG. 9 is a schematic structural diagram of a network access device 900 according to embodiment 9 of the present invention.

Referring to FIG. 9, this embodiment provides a network access device 900, which mainly includes: a memory 901, a first authenticating encryptor 902, a controller 903 and an accessor 904. Connection relations among each components and operational principles are as follows:

The memory 901 is configured to store pre-stored information of a soft SIM card, the information of the soft SIM card at least includes an identity of the soft SIM card, and authentication and encryption information corresponding to the soft SIM card. The authentication and encryption information corresponding to the soft SIM card may be but not limited to authentication and encryption information of the soft SIM card generated when generating soft SIM card information, and may also be but not limited to authentication and encryption information of another SIM card designated by the user which is acquired based on designation of the user.

The first authenticating encryptor 902 is configured to, under control of the controller unit 903, generate and transmit an encryption factor to the user, and generate network key information based on the encryption factor, and the identity of the soft SIM card and the authentication and encryption information corresponding to the soft SIM card stored in the memory 901 according to a predefined encryption policy corresponding to the SIM card stored in the memory 901, and compare whether the network key information is consistent with terminal key information fed back by the soft SIM card or not, if consistent, then feed back an authentication result to the controller 903: authentication passed. Here, the terminal key information is: generated by a terminal in which the soft SIM card is located based on the encryption factor, the identity of the soft SIM card and authentication and encryption information of a second SIM card (may be but not limited to a hard SIM card in this terminal) in the terminal and according to a predefined encryption policy. The principles may be referred to the relative descriptions of steps 202-208 in Embodiment 2, but they should not be limited herein.

The controller 903 is configured to control the first authenticating encryptor 902, and control an operation of the accessor 904 based on feedback of the first authenticating encryptor 902.

The accessor 904, is electrically connected to the controller 903, and is configured to provide network access to the SIM card under control of the controller 903.

The operational principles of the network accessor 904 in this embodiment may be referred to the relative descriptions of Embodiment 2, but they should not be limited herein.

It can be seen from the above that, by applying the technical solution of this embodiment, since the technical solution of this embodiment is applied, when the network deals with a network-joining request of the soft SIM card, network key information is generated at the network side based on an encryption factor, an identity of a soft SIM card, and authentication and encryption information corresponding to the soft SIM card and according to a predetermined encryption policy, when performs authenticating, compares the network key information with terminal key information generated by a terminal based on the encryption factor issued by the network, an identity of the soft SIM card acquired by the terminal, and the authentication and encryption information of the second SIM card in the terminal and according to a predetermined encryption policy, if it is not consistent, then determines that the user is an illegal user of the soft SIM card.

It can be seen from the above that, by applying the technical solution of this embodiment, even though the information of the soft SIM card is acquired by the user, but if the bound SIM card designated by the legal user of the soft SIM card is not installed in the terminal in which the soft SIM card is located, it is still not possible to obtain the terminal key information which is consistent with the network key information, thus the soft SIM card cannot join the network, and the application of the soft SIM card cannot be realized. It can be seen that applying the technical solution of this embodiment is beneficial for greatly improving the application security of the soft SIM card.

In addition, the memory 901 may further store information of the bound SIM card which is preset for the soft SIM card by the user of the SIM card, and authentication and encryption information of the bound SIM card, the authentication and encryption information of the bound SIM card is stored as authentication and encryption information corresponding to the soft SIM card, so that the network access device generates network key information based on the authentication and encryption information of the bound SIM card when handling a network-joining request of the soft SIM card, so as to compare with the terminal key information which is generated by the terminal based on the authentication key information of the second SIM card in the terminal, and determine whether the user is a legal user of the soft SIM card or not. Please refer to the relative descriptions in Embodiments 2-8 for further details.

In addition, the network access device may further includes a shared querier 905, the shared querier 905 is electrically connected to the memory 901, and is configured to query to get authentication and encryption information of the bound SIM card from a home network of the bound SIM card based on the information of the bound SIM card, and store the authentication and encryption information of the bound SIM card to the memory 901. Please refer to the relative descriptions in Embodiments 2-6 for further details.

In addition, the network access device in this embodiment may further include but not limited to: a second authenticating encryptor 906.

The second authenticating encryptor 906, is electrically connected to the controller 903, and is configured to perform further authentication processing under control of the controller 903, where the authentication processing includes: after the authentication of the first authenticating encryptor 902 is passed, the second authenticating encryptor 906 is configured to further compare whether information on a terminal in which the soft SIM card is located of each of the designated bounding object information corresponding to the soft SIM card is consistent with the stored information of the designated bounding object corresponding to the soft SIM card stored in the memory 901 or not, if consistent, then feed back an authentication result to the controller 903: authentication passed. Accordingly, the controller 903 is configured to control the accessor 904 to provide network access for the SIM card after receiving the authentication results, which are both authentication passed, of the first comparer and the second authenticating encryptor 906. Further operational principles and beneficial effects may be referred to the relative descriptions in Embodiment 4, but they should not be limited herein.

It can be seen from the above that, since the network access device further includes the second authenticating encryptor 906, a second authentication control for the network-joining of the soft SIM card can be realized at the network side, thereby further improving the application security of the soft SIM card, and avoiding the soft SIM card to be peculated illegally.

The apparatus embodiments described above are merely illustrative, where an element described as a separated component may be or may not be physically separated, the component illustrated as an element may be or may not be a physical element, that is, it may be located in one place, or may also be distributed to a plurality of the network elements. The purpose of the solution of the embodiment may be achieved by selecting a part of or all the modules according to actual needs. Persons of ordinary skill in the art may understand and implement the solution without creative work.

With the description of the foregoing embodiments, persons of ordinary skill in the art may clearly understand that the various embodiments may be implemented in the form of software with necessary common hardware platform, of course, may also through hardware. Based on this understanding, the foregoing technical solution, substantially or the part which contributes to the prior art may be reflected in the form of software products, the computer software product may be stored in a computer-readable storage medium such as a ROM, a RAM, a magnetic disk, or an optical disk, including some codes which make a computer device (may be a personal computer, a server, or a network access device and so on) perform the method of each embodiment or certain parts of the embodiment.

The foregoing embodiments do not constitute a limitation on the scope of the technical solutions. Any modifications, equivalent substitutions and improvements and the like within the range of the spirit and principle of the foregoing embodiments, should be included in the scope of protection of the technical solutions.

What is claimed is:

1. A method for activating a soft subscriber identity module (SIM) card, the method comprising:
   acquiring information on a terminal in which a soft SIM card is located of a bounding object corresponding to the soft SIM card, according to information of the soft SIM card;
   generating first key information according to the information of the soft SIM card and the information on the terminal in which the soft SIM card is located of the bounding object and according to a predefined encryption policy;
   comparing whether the first key information is consistent with preset key information corresponding to the soft SIM card, and if consistent, allowing an activation of the soft SIM card, so as to enable a user to perform network communication via the soft SIM card;
   wherein the preset key information corresponding to the soft SIM card is: key information which is generated according to the information of the soft SIM card and preset information of each bounding object by the operator of the soft SIM card and according to the predefined encryption policy, and is provided to the user,
   wherein the soft SIM card is realized by storing all information originally set in a hard SIM in a soft SIM card file by an operator issuing the SIM card through documenting the information.

2. The method for activating a soft SIM card according to claim 1, wherein:
   the generating the first key information according to the information of the soft SIM card and the information on the terminal in which the soft SIM card is located of the bounding object, comprises:
   generating the first key information according to an identity of the soft SIM card and the information on the terminal in which the soft SIM card is located of the bounding object.

3. The method for activating a soft SIM card according to claim 1, wherein:
   the generating the first key information according to the information of the soft SIM card and the information on the terminal in which the soft SIM card is located of the bounding object, comprises:
   generating the first key information according to an identity of the soft SIM card, authentication and encryption information of the soft SIM card, and the information on the terminal in which the soft SIM card is located of the bounding object.

4. The method for activating a soft SIM card according to claim 2, wherein:
   the identity of the soft SIM card comprises: a calling number of the soft SIM card, or an international mobile subscriber identification number of the soft SIM card.

5. The method for activating a soft SIM card according to claim 1, wherein:
   the bounding object is null, or comprises one or more of the following:
   the terminal in which the soft SIM is located, and a second SIM card in the terminal;
   the information on the terminal in which the soft SIM card is located of the bounding object is null, or, the information on the terminal in which the soft SIM card is located of the bounding object comprises one or more of the following:
an identity of the terminal, an identity of the second SIM card, and authentication and encryption information of the second SIM card.

6. The method for activating a soft SIM card according to claim 5, wherein:
the identity of the terminal comprises: an international mobile equipment identity of the terminal;
the identity of the second SIM card comprises one or more of the following:
an international mobile subscriber identification number, and a calling number of the second SIM card.

7. The method for activating a soft SIM card according to claim 5, wherein:
the second SIM card is a hard SIM card.

8. The method for activating a soft SIM card according to claim 1, wherein:
the acquiring the information on the terminal in which the soft SIM card is located of the bounding object corresponding to the soft SIM card, comprises:
if the bounding object corresponding to the soft SIM card cannot be determined by reading the information of the soft SIM card,
reading an identity of the terminal, or information of a second SIM card in the terminal, respectively,
taking one or more of the following information: the identity of the terminal, and/or the information of the second SIM card in the terminal, as information of each optional bounding object respectively,
generating each piece of contrastive key information, respectively, according to the information of the soft SIM card combined with the information of each of the optional bounding object respectively and according to a predefined encryption policy,
comparing whether each piece of the contrastive key information is consistent with the preset key information corresponding to the soft SIM card, and if consistent, taking the information of the optional bounding object corresponding to the contrastive key information as: the information on the terminal in which the soft SIM card is located of the bounding object corresponding to the soft SIM card.

9. The method for activating a soft SIM card according to claim 1, wherein:
the acquiring the information on the terminal in which the soft SIM card is located of the bounding object corresponding to the soft SIM card, comprises:
reading the information of the soft SIM card, determining a designated bounding object of the soft SIM card, and reading the information on the terminal in which the soft SIM card is located of the designated bounding object.

10. A terminal, comprising:
a reading unit, configured to read information of a soft subscriber identity module (SIM) card in the terminal, and acquire information on the terminal of a bounding object corresponding to the soft SIM card according to the information of the soft SIM card;
an encrypting unit, configured to generate first key information according to the information of the soft SIM card and the information of the bounding object and according to a predefined encryption policy;
a comparing unit, configured to compare whether the first key information is consistent with preset key information corresponding to the soft SIM card, wherein the preset key information corresponding to the soft SIM card is: key information generated according to the information of the soft SIM card and preset information of each bounding object by an operator of the soft SIM card and according to the predefined encryption policy, and provided to a user;
an antenna, configured to transmit information to a network, and receive information transmitted by the network, wherein, the information transmitted to the network comprises: when the first key information is consistent with the preset key information corresponding to the soft SIM card, a network-joining request,
wherein the soft SIM card is realized by storing all information originally set in a hard SIM in a soft SIM card file by an operator issuing the SIM card through documenting the information.

11. The terminal according to claim 10, further comprising:
a storing unit, configured to store information, the stored information comprises: information of the soft SIM card,
the information of the soft SIM card comprises: an identity of the soft SIM card, and the preset key information corresponding to the soft SIM card.

12. A network access device, comprising:
a storing unit, configured to store information of a soft subscriber identity module (SIM) card, wherein the information of the soft SIM card comprises an identity of the soft SIM card, and authentication and encryption information corresponding to the soft SIM card;
a first authenticating and encrypting unit, configured to, under control of a controlling unit, generate and transmit an encryption factor to a user, and generate network key information according to the encryption factor, the identity of the soft SIM card stored in the storing unit, and the authentication and encryption information corresponding to the soft SIM card and according to a predefined encryption policy corresponding to the SIM card, and compare whether the network key information is consistent with terminal key information fed back by the soft SIM card, and if consistent, feedback a result of authentication to the controlling unit indicating authentication passed;
wherein the terminal key information is generated by a terminal in which the soft SIM card is located according to the encryption factor, the identity of the soft SIM card and authentication and encryption information of a second SIM card in the terminal and according to the predefined encryption policy;
the controlling unit, configured to control the first authenticating and encrypting unit, and control an operation of an access unit according to feedback of the first authenticating and encrypting unit;
the access unit, configured to provide network access for the SIM card under control of the controlling unit,
wherein the soft SIM card is realized by storing all information originally set in a hard SIM in a soft SIM card file by an operator issuing the SIM card through documenting the information.

13. The network access device according to claim 12, wherein,
the information of the soft SIM card stored in the storing unit further comprises: information of a bound SIM card which is preset for the soft SIM card by a user of the soft SIM card, and authentication and encryption information of the bound SIM card, the authentication and encryption information of the bound SIM card is stored as authentication and encryption information corresponding to the soft SIM card.

14. The network access device according to claim 13, further comprising:
a shared querying unit, configured to query to obtain authentication and encryption information of the bound SIM card from a home network of the bound SIM card according to the information of the bound SIM card, and store the authentication and encryption information of the bound SIM card to the storing unit.

15. The network access device according to claim 14, wherein,
the information of the soft SIM card stored in the storing unit further comprises: stored information of a designated bounding object corresponding to the soft SIM card;
the network access device further comprises:
a second authenticating and encrypting unit, which is electrically connected to the controlling unit, and is configured to perform further authentication processing under control of the controlling unit, wherein the authentication processing comprises: after the authentication of the first authenticating and encrypting unit is passed, the second authenticating and encrypting unit is configured to further compare whether information on a terminal in which the soft SIM card is located of each of the designated bounding object information corresponding to the soft SIM card is consistent with the stored information of the designated bounding object corresponding to the soft SIM card stored in the storing unit, and if consistent, feed back a result of authentication to the controlling unit indicating authentication passed;
wherein the controlling unit is configured to control the access unit to provide network access for the SIM card after receiving the results, which are both authentication passed, of authentication of the first comparing unit and the second authenticating and encrypting unit.

* * * * *